US010063446B2

(12) United States Patent
Dubal et al.

(10) Patent No.: US 10,063,446 B2
(45) Date of Patent: Aug. 28, 2018

(54) NETFLOW COLLECTION AND EXPORT OFFLOAD USING NETWORK SILICON

(71) Applicant: Intel Corporation, Santa Clara, CA (US)

(72) Inventors: Scott P. Dubal, Beaverton, OR (US); James R. Hearn, Hillsboro, OR (US); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 14/751,819

(22) Filed: Jun. 26, 2015

(65) Prior Publication Data

US 2016/0380865 A1   Dec. 29, 2016

(51) Int. Cl.
*H04L 12/26* (2006.01)
*H04L 12/24* (2006.01)
*G06F 9/455* (2018.01)

(52) U.S. Cl.
CPC .......... *H04L 43/10* (2013.01); *G06F 9/45558* (2013.01); *H04L 41/046* (2013.01); *G06F 2009/45595* (2013.01)

(58) Field of Classification Search
None
See application file for complete search history.

(56) References Cited

U.S. PATENT DOCUMENTS 8,073,968 B1    12/2011  Shah et al.
9,548,908 B2 *   1/2017  Nguyen ............... H04L 43/026
2012/0310952 A1* 12/2012 Reilly .................... H04L 43/04
                                                          707/752
2013/0117847 A1*  5/2013  Friedman ............. H04L 63/102
                                                          726/22
2013/0215897 A1   8/2013  Warren et al.
2014/0313887 A1  10/2014  Kim et al.
2015/0085694 A1   3/2015  Agarwal et al.

FOREIGN PATENT DOCUMENTS

KR       10-1045362 B1     6/2011

OTHER PUBLICATIONS

International Search Report and Written Opinion received for PCT Patent Application No. PCT/US2016/034117, dated Aug. 16, 2016, 13 pages.

* cited by examiner

*Primary Examiner* — Azizul Choudhury
(74) *Attorney, Agent, or Firm* — Law Office of R. Alan Burnett, P.S.

(57) ABSTRACT

Methods and apparatus for collection of Netflow data and export offload using network silicon. In accordance with aspects of the embodiments, the Netflow export and collection functions are offloaded to the network silicon in the chipset, System on a Chip (SoC), backplane switch, disaggregated switch, virtual switch (vSwitch) accelerator, and Network Interface Card/Controller (NIC) level. For apparatus implementing virtualized environments, one or both of the collection and export functions are implemented at the Physical Function (PF) and/or Virtual Function (VF) layers of the apparatus.

24 Claims, 15 Drawing Sheets

US 10,063,446 B2

NETFLOW COLLECTION AND EXPORT OFFLOAD USING NETWORK SILICON

BACKGROUND INFORMATION

NetFlow is a network protocol developed by Cisco for collecting IP traffic information and monitoring network traffic, and is designed to work with Cisco networking equipment. By analyzing flow data, a picture of network traffic flow and volume can be built. Using a NetFlow collector and analyzer, an administrator can see various traffic loads, sources, and destinations."

Major IT (information technology) shops are starting to use Netflow analysis to detect specific traffic patterns. Netflow is also being used within private and public networks such as Amazon EC2, Facebook, and others. With proper analysis, rouge or malicious agents can be detected and isolated before stealing information and/or bringing down the network.

Currently, only Cisco network switches are enabled to provide Netflow data. This is useful but only at a course level. If the switch port is connected to a non-Cisco backplane aggregator switch, then the Netflow switch cannot see what types of traffic patterns and are occurring on the individual ports within the platform and therefore cannot capture fine-grained Netflow data on what type of network traffic is being received on a per NIC port or per NIC port queue basis. Looking deeper, a single system, such as a microserver or blade server, has many cores and may be the host to dozens of virtual machines, service chains, or containers; each of these instances are capable of generating traffic. With current technology, only aggregated platform data is available for Netflow analysis.

Existing intra-platform network controllers are not Netflow-enabled. The current method to provide platform level Netflow information is to force network kernel software to physically inspect each and every incoming and outgoing packet. Physically inspecting each packet in software results in significant performance degradation, this is especially true in high speed 10 GbE+ Ethernet networks. Offloading the collection and export of platform level Netflow data to network and/or chipset silicon can alleviate such performance problems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
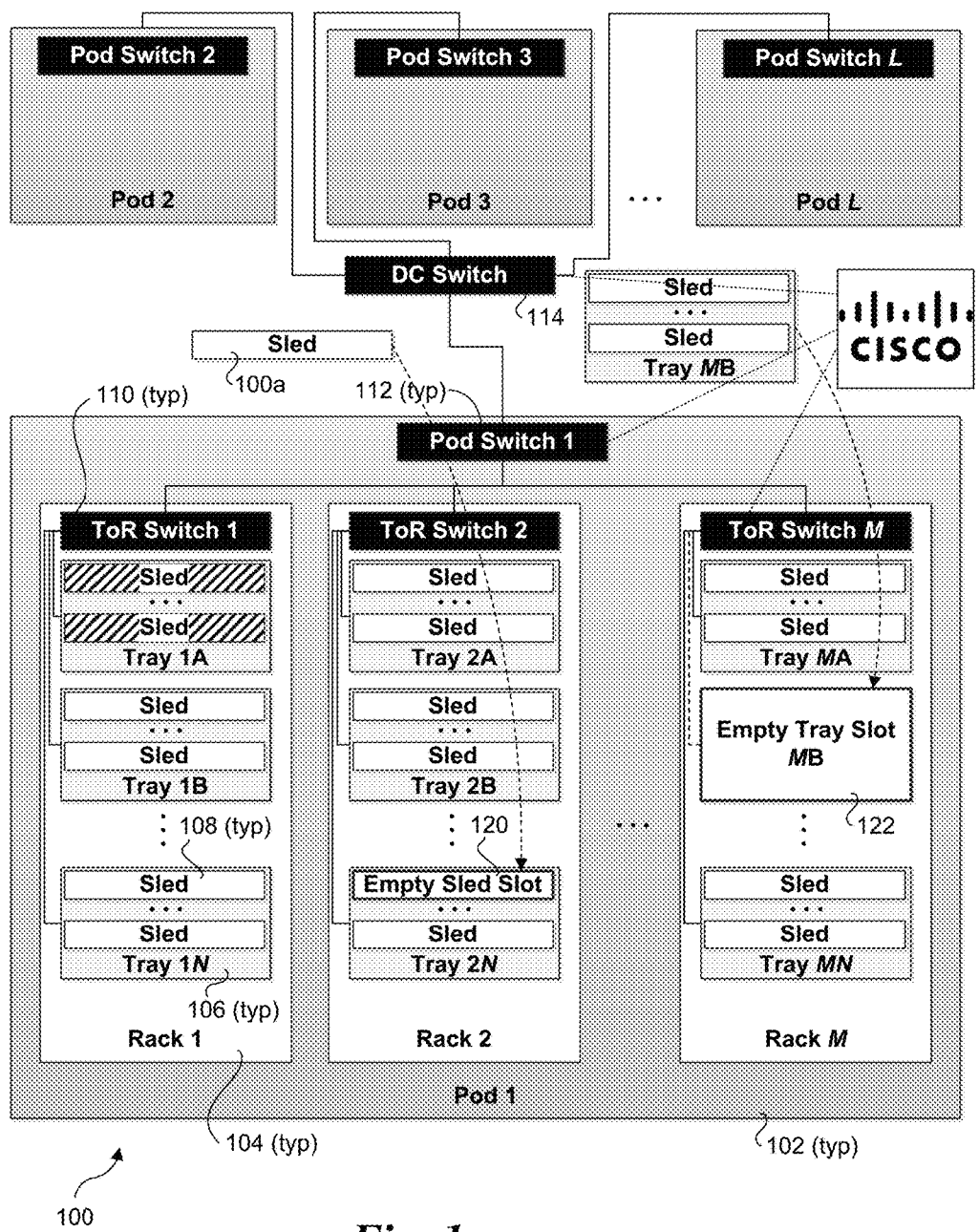
FIG. 1 is a schematic diagram illustrating implementing of Cisco Netflow-enabled switches in a data center hierarchy including pods, racks, trays, and sleds.

Embodiments of methods and apparatus for Netflow collection and export offload using network silicon are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

To have a more thorough understanding of how Netflow is currently deployed, a discussion of the conventional use of Netflow within a data center is now presented. In recent years, implementation of "cloud-based" services, high-performance computing (HPC) and other activities employing data centers and the like have seen widespread adoption. Under a typical data center installation, a large number of servers installed in server chassis and server racks are interconnected in communication using network links (e.g., Ethernet) and various switching mechanisms, such as switch blades/modules and "top-of-rack" (ToR) switches. In some installations, additional links, such as InfiniBand or Fibre Channel, may used for storage and other purposes.

Data centers commonly employ a physical hierarchy of compute, network and storage shared resources to support scale out of workload requirements. FIG. 1 shows a portion of a data center 100 an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc.

Depicted at the top of each rack 104 is a respective ToR switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hexarchies that use physical LANs. In practice, it is common to deploy virtual LANs using underlying physical LAN switching facilities, as discussed below in further detail.

As discussed above, Netflow is currently enabled only on Cisco network switches. In FIG. 1, these switches are depicted using white text on a black background. Generally, Netflow will be used at the ToR switches 110, although it also might be used at the pod switch or DC switch levels [let me know if only the ToR switches would use Netflow]. The problem with this approach is there is a significant amount of network traffic at lower levels in the data center hierarchy that never (or rarely) passes through a ToR switch; thus, Netflow information for this traffic is unavailable under the conventional implementation of Netflow.

A typical flow monitoring setup that employs Netflow consists of the following main components: 1) a Flow Exporter; 2) a Flow Collector; and 3) an Analysis Application. The flow exporter aggregates packets into flows and exports flow records. The flow collector is responsible for the reception, storage and pre-processing of flow data received from a flow exporter. The analysis application analyzes received flow data and is generally targeted for one or more purposes, such as analyzing flow data in the context of instruction detection or traffic profiling.

In accordance with aspects of the embodiments disclosed herein, the Netflow export and collection functions are offloaded to the network silicon in the chipset, System on a Chip (SoC), backplane switch, vSwitch accelerator, or Network Interface Card (NIC) level. In one aspect, one or both of the export and collection functions are implemented at the Physical Function (PF) and/or Virtual Function (VF) layers. By enabling collection and export of Netflow data at the PF and/or VF layers, much more detailed flow data can be collected for each compute node, VM (Virtual Machine), or queue involved. Platform level Netflow data can help an administrator detect rogue VMs or applications within a platform. In contrast, under today's approach, errant activity can only be isolated to the system level of granularity.

This targeted Netflow collection will also be valuable in identifying network hosts based on their Netflow data (or lack thereof). By offloading collection and export to hardware, the embodiments improve system performance and prevents a rogue VM from sending falsified Netflow data to mask its presence.

In addition, embodiments may be configured to allow the individual queues of a NIC to be monitored. This could be used to improve the priority settings and traffic treatment within a system and may spur the migration of VMs to a balance traffic needs. If a malicious agent is detected, all non-infected VMs can be migrated to other systems while the infected VM is isolated.

The embodiments also enables the collection of VM-to-VM traffic. Previously, if Netflow data were only collected at the external or top-of-rack switch, then vSwitch (virtual switch) traffic was not collected. Under some embodiments, vSwitch offload accelerators such as Intel® Red Rock Canyon can collect and report Netflow data for VM-to-VM traffic.

Generally, the techniques described herein enable collection and/or export of Netflow data at one or more levels within the data center hierarchy below the rack level. In accordance with the data center hierarchy of FIG. 1, this includes collection and/or export of Netflow data at the tray level, and the sled level, at the internally within a single platform below the sled level. Under another data center hierarchy that employs sub-racks, each configured to house multiple server chassis, which in turn may house multiple server blades or modules, collection and export of Netflow data is at the sub-rack level, the server chassis level, and the server blade or module level.

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using VMs, the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

The VMMs/Hypervisors implement a virtualization intermediary layer that provides an abstraction between the operating system images (SI's) running on the VMs and the platform hardware. The virtualization intermediary layer provides a set of virtual system resources to each SI, while the virtual resources are actually mapped to physical resources behind the scenes in a manner that is transparent to the SIs.

Figure 2:
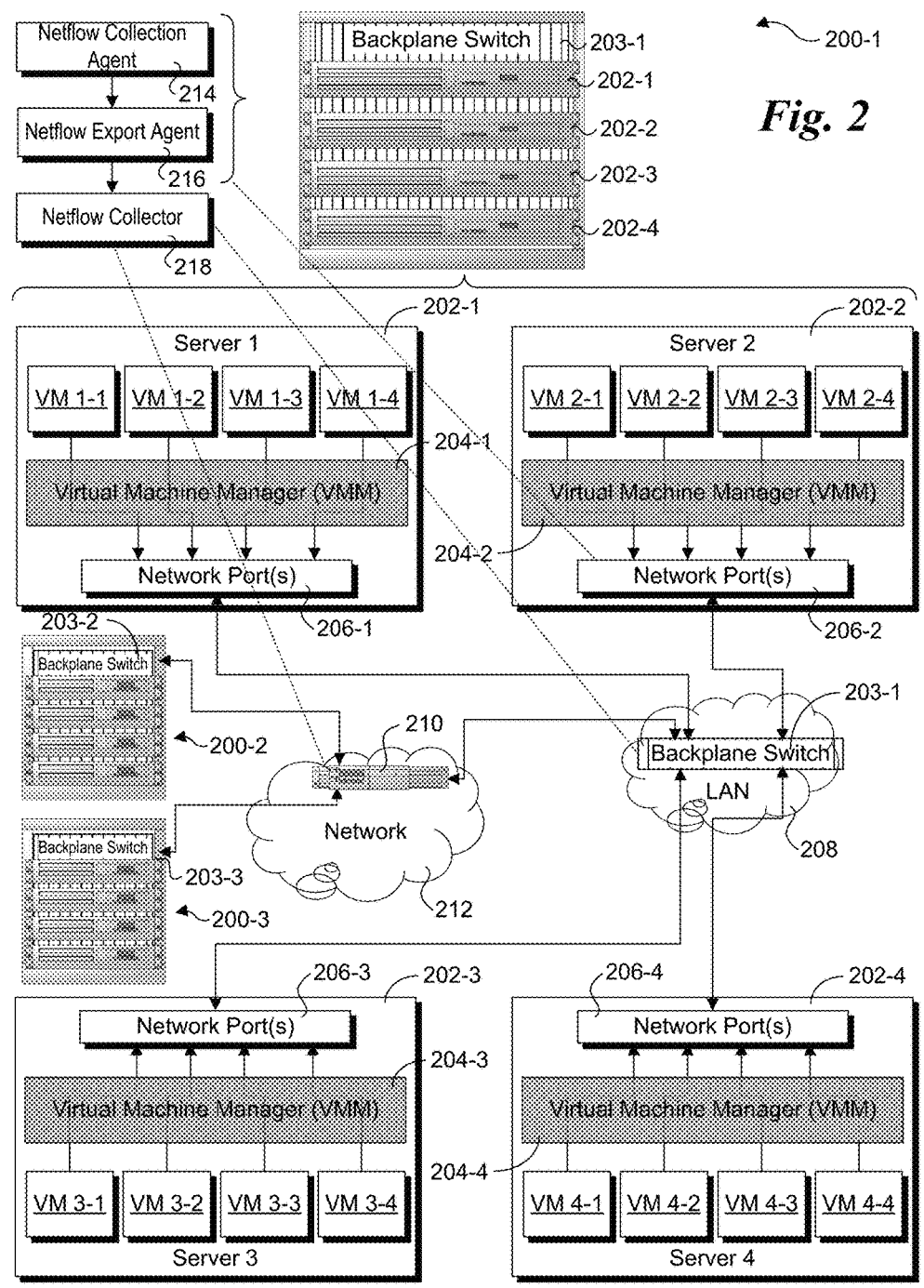
FIG. 2 is a combined schematic and block diagram illustrating a high-level view of communications between multiple VMs running on servers in a sled or sub-rack.

FIG. 2 shows an exemplary implementation of the collection and export of Netflow data at the tray level. FIG. 2 depicts a high-level view of communications between multiple VMs running on servers in a tray 200-1, or otherwise at an aggregation in the data center hierarchy below the rack level (e.g., at a sub-rack level). Tray 200-1 is typical of servers implemented in high-density server farms and data centers, and includes a frame in which multiple sleds 202-1, 202-2, 202-3 and 202-4 are installed, with each sled installed in a corresponding slot in the tray and housing one or more physical servers. (For illustrative purposes, there is a 1:1 relationship between sleds and servers in FIG. 2; however, a given sled may house multiple physical servers in some embodiments.) In one embodiment, the sleds in a given tray are coupled in communication with a backplane switch 203. Under an alternative embodiment that employs servers installed in sub-racks (not shown), the servers in a given sub-rack may be communicatively coupled to a switch associated with the sub-rack via Ethernet cables or the like. Generally, servers may be communicatively coupled to one another via one or more of backplanes and network switches. It is further noted that in some embodiments a backplane switch is not actually implemented in the backplane itself; rather, the switch is implemented in a card or blade that is coupled to the backplane.

FIG. 2 depicts further details of servers 1-4, wherein each server block diagram corresponds to a respective sled 202-1, 202-2, 202-3 and 202-4 in tray 200-1 sharing the same appended reference number. Each of servers 1-4 include various hardware components such as a processor and memory (not shown) for hosting a respective Virtual Machine Manager (VMM) 204 instance and four virtual machines. (As used herein, the terms VMM and Hypervisor may generally be used interchangeably when either a VMM or Hypervisor is shown in a drawing figure). By way of example, server 1 hosts a VMM 204-1 and virtual machines VM 1-1, VM 1-2, VM 1-3, and VM 1-4. Each server also includes one or more network ports 206 (e.g., network port 206-1 for server 1). In some embodiments, the network ports are representative of applicable PCIe (Peripheral Component Interconnect Express) interfaces and Network Interface Controller (NIC) hardware and logic to facilitate communication over a Local Area Network 208 that employs backplane switch 203 for routing and switching functions. For example, the NIC hardware may correspond to a wired Ethernet interface or a wireless interface to support a wireless connection, such as an IEEE 802.11n connection. In turn, backplane switch 203 is depicted as being connected to a ToR switch 210 in a network 212. Also shown are two additional trays 200-2 and 200-3, each having a similar configuration to tray 200-1 and including a respective backplane switch 203-2 and 203-3 shown connected to ToR switch 210.

Figure 2A:
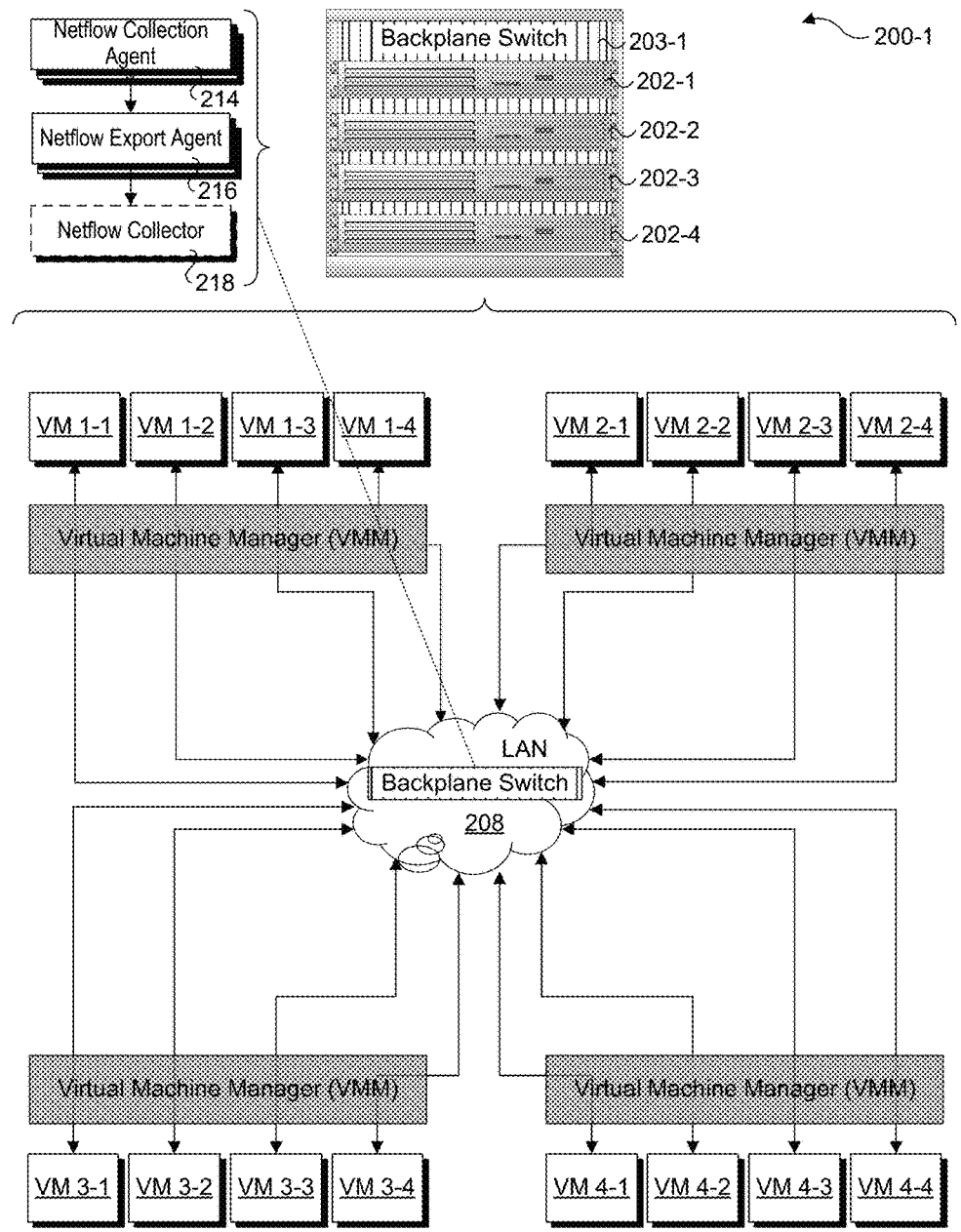
FIG. 2*a* is an abstracted version of FIG. 2 illustrating communications between VMs in the sled or sub-rack.

FIG. 2a shows an abstracted version of FIG. 2, wherein just the virtual machines, VMMs, backplane switch 203 and LAN 208 are shown to better illustrate communication paths between VMs that are hosted by servers in the same tray or sub-rack. Notably, any communication between VMs hosted by servers in different sleds is routed through network devices that are external to the sleds (e.g., backplane switch 203-1 for LAN 208).

Under the implementation shown in FIG. 2, Netflow information is collected at one or more network ports 206, which in turn are implemented in NICs associated with the one or more network ports. At an abstract level, the process is depicted as a Netflow collection agent 214, and a Netflow export agent 216, which are implemented one or more of network ports 206. A Netflow collector is implemented at some component higher up in the data center hierarchy, such as a backplane switch 203 or ToR switch 210. In some embodiments, a Netflow export agent is implemented in a component that is external to the network port.

Cisco defines a standard Netflow as a unidirectional sequence of packets that all share the same values for the following 7 key fields.
1. Source IP address
2. Destination IP address
3. Source port for UDP or TCP, 0 for other protocols
4. Destination port for UDP or TCP, type and code for ICMP, or 0 for other protocols
5. Layer 3 Protocol
6. IPTypeof Service
7. Input interface (SNMP ifIndex)

In one embodiment, a packet inspection logic inspects the packet headers of packets received at a given network port/NIC, and exposes the header field values to Netflow collection agent 214. Optionally, packet inspection logic and Netflow collection agent 214 are integrated into the same processing block. As yet another option, the Netflow collection agent may be configured to inspect packets/capture header field values before or after packet inspection operations performed on incoming and/or outgoing packets.

NetFlow operates by creating a NetFlow cache entry that contains the information for all active flows. The NetFlow cache is built by processing the first packet of a flow through the standard switching path. A Flow record is maintained within the NetFlow cache for all active flows. Each flow record in the NetFlow cache contains key fields that can be later used for exporting data to a collection device. Each flow record is created by identifying packets with similar flow characteristics and counting or tracking the packets and bytes per flow. In one embodiment, the flow details or cache information is exported to a flow collector server periodically based upon flow timers. The function is performed by Netflow export agent 216 and Netflow collector 218. The collector contains a history of flow information that was switched within the network device. The Netflow collector is further configured to forward the Netflow data to either an analysis host device or a network port on a Cisco switch (e.g., a ToR switch) that is configured for receiving Netflow data.

Under the scheme illustrated in FIG. 2a, collection of the Netflow data is performed by logic in backplane switch 203.

In one embodiment, the logic includes a plurality of Netflow collection agents 214 and Netflow export agents 216, and a Netflow collector 218. Generally, packet inspection and generation of Netflow data may be implemented at one or more of the switch interfaces/ports of backplane switch 203.

Figure 3:
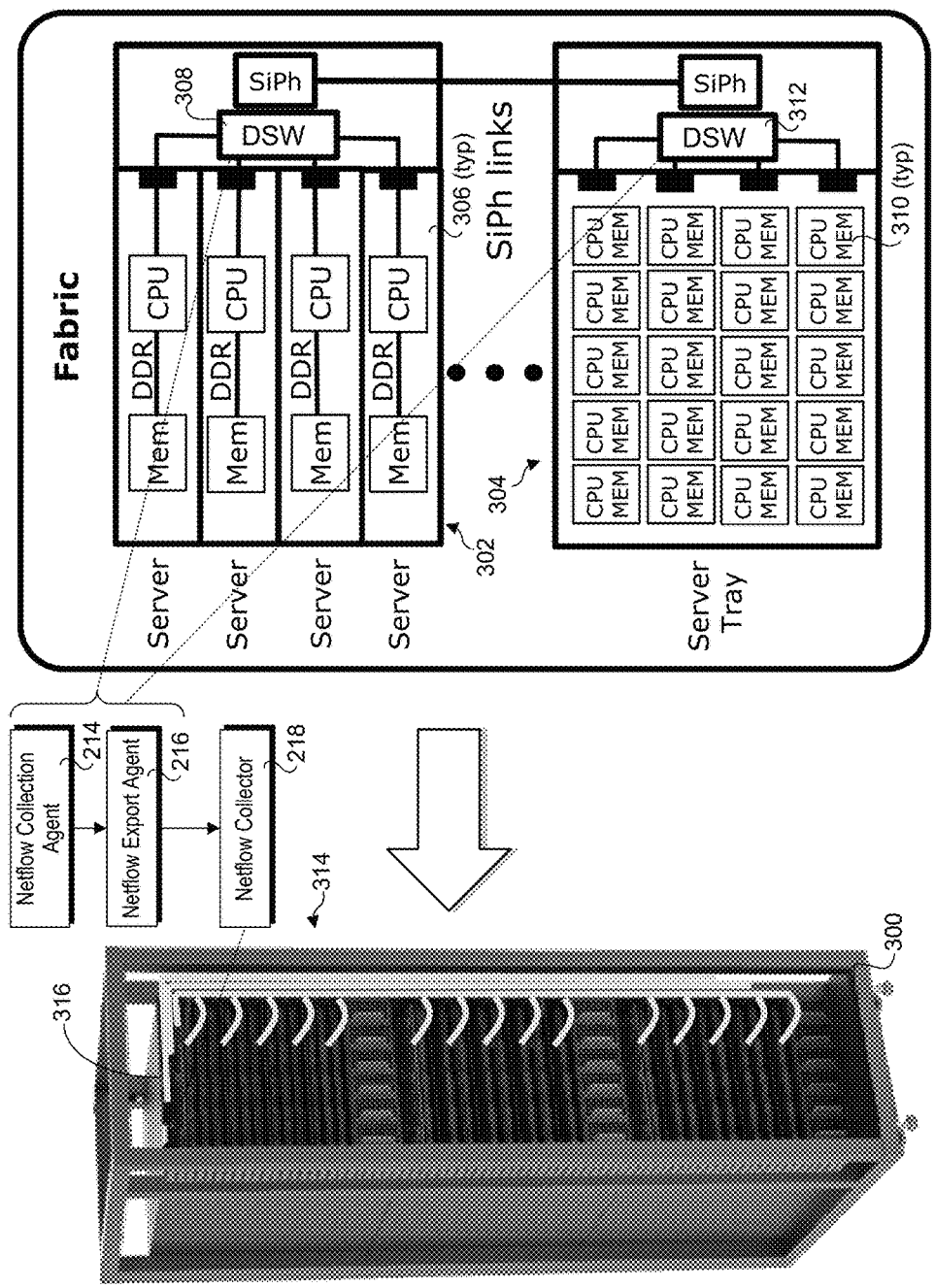
FIG. 3 is a schematic diagram illustrating a rack-level architecture employing server chassis with disaggregated edge switches coupled via SiPh links.

FIG. 3 shows an exemplary rack server environment in which aspects of the embodiments disclosed herein may be implemented. The environment includes a rack 300 including a plurality of slots in which respective server chassis are installed, including server chassis 302, microserver chassis 304, and, optionally, other types of rack chassis, such as storage chassis. It is noted that rack 300 generally may be populated with a mixture of server chassis 302 and microserver chassis 304, only server chassis 302, or only server chassis 306. Server chassis 302 includes a plurality of servers 306, each communicatively coupled to a disaggregated switch (DSW) 308. Microserver chassis 304 includes one or more server trays in which a plurality of microservers 310 are installed, each communicatively coupled to a disaggregated switch 312. The disaggregated switches 308 and 312 in server chassis 302 and microserver chassis 304 are communicatively coupled via SiPh links 314. SiPh links are also employed to connect at least a portion of the servers and/or microservers to a ToR switch 316.

FIGS. 4a and 4b show further details of a server chassis 302, according to one embodiment. Server chassis 302 includes four 2-socket servers 400, each including a main server board 402 having two sockets in which respective CPUs 404 are installed. Also mounted on main server board 402 are a plurality of DIMM (Dual in-line Memory Module) connectors in which respective DIMM memory modules 406 are installed. In addition, each socket will include its own set of resources, and is configured to be operated independent of the other socket. At the same time, data transfer between sockets is facilitated via a socket-to-socket interconnect, such as an Intel® QuickPath Interconnect (QPI). When data is pulled from memory in a host in a multi-socketed server that is not directly connected to the DSW, the data is forwarded via the socket-to-socket interconnect to a host that is directly connected to the DSW.

Each main server board 400 includes an edge connector or multi-pin connector at its rear that is coupled into a mating connector 408 that is mounted to a backplane board 410. Disaggregated switch 308 is implemented on a mezzanine card 412 that is communicatively coupled to backplane board 410. Mezzanine card 412 includes a DSW SoC 413, a CPU 414, a memory module 416, and a plurality of SiPh modules 418. In the illustrated embodiment, SiPh modules 418 and corresponding SiPh PHY interface circuitry on DSW SoC 413 facilitate 12 transceiver lanes; however, this is merely exemplary, as other numbers of SiPh transceiver lanes may be implemented.

Figure 4:
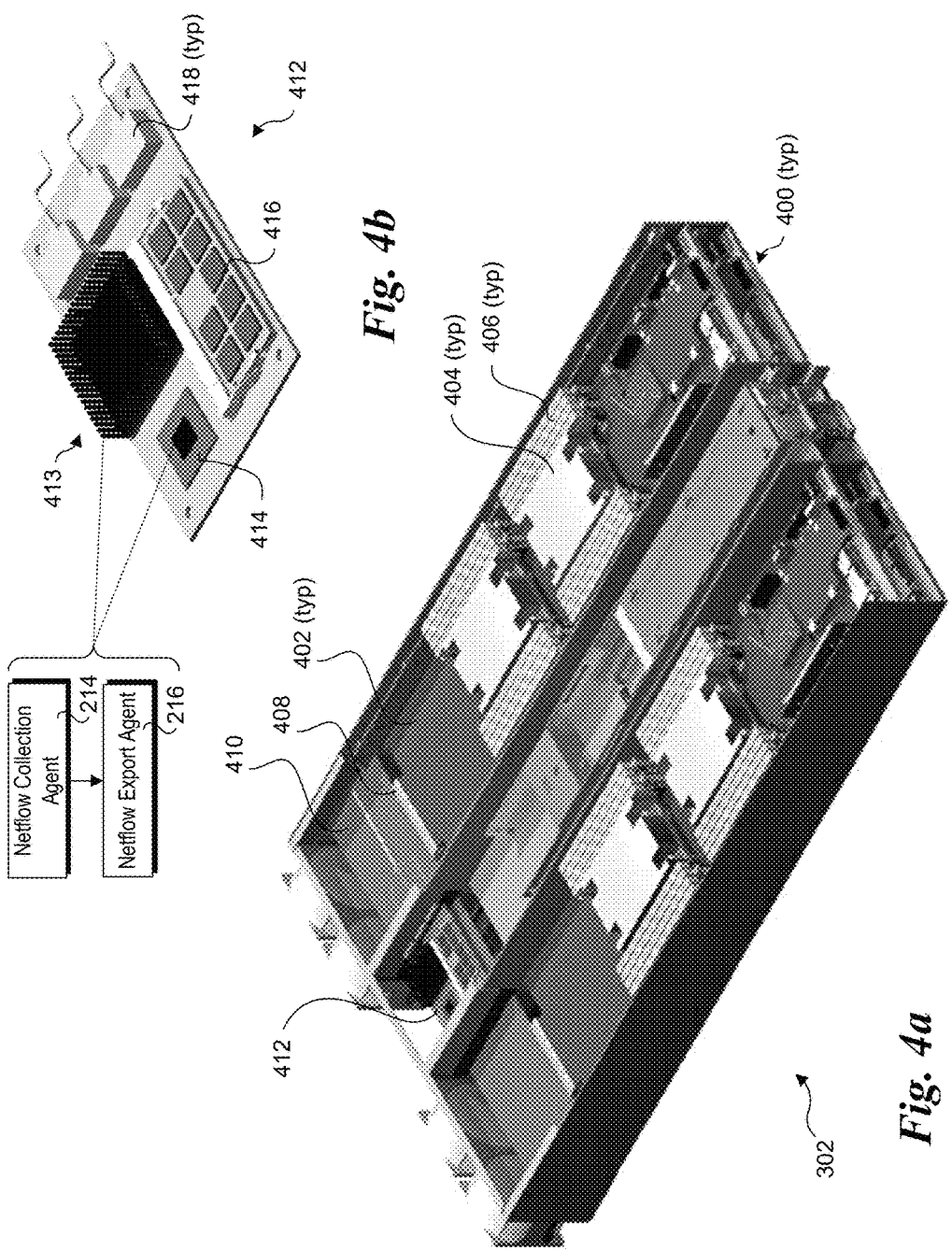
FIGS. 4*a* and 4*b* illustrate a DSW server including four 2-socket servers and a disaggregated switch mezzanine card communicatively coupled to the servers via PCIe links, according to one embodiment.

In the embodiment of FIGS. 3 and 4, capturing and exporting of Netflow data is performed at the disaggregated switches 308 and 312, using one or more Netflow collection agents 214 and Netflow export agents 216. The one or more Netflow export agents then export the Netflow data to a Netflow collector 218 in ToR switch 316. As shown in FIG. 4, under respective embodiments Netflow collection agent 214 and Netflow export agent 216 are implemented as software running on CPU 414 or DSW SoC 413.

Figure 5:
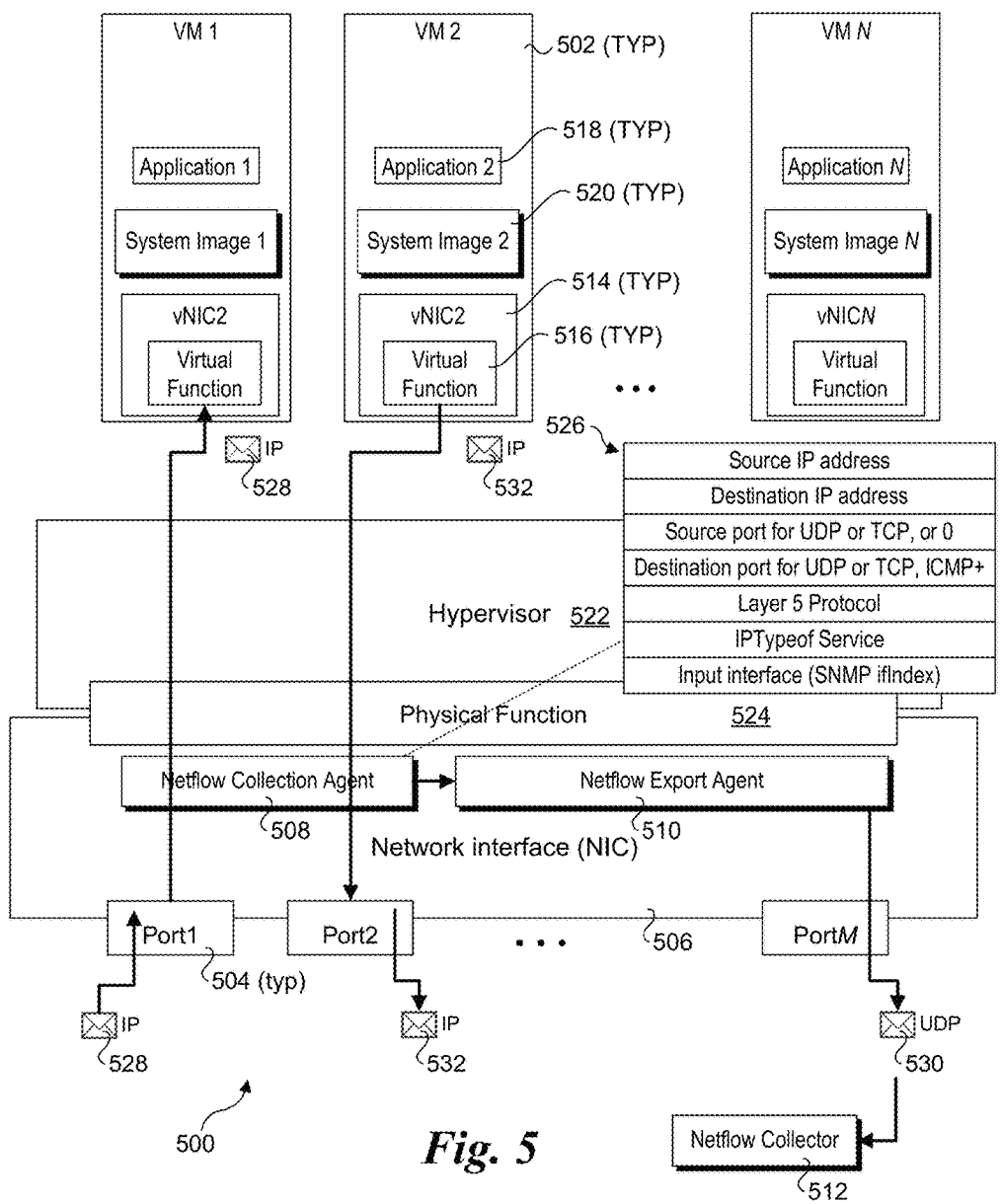
FIG. 5 is a schematic diagram illustrating one embodiment of a Netflow data capture scheme that is implemented to monitor traffic forwarded to and sent from applications running on VMs within a server.

FIG. 5 depicts one embodiment of a Netflow data capture scheme that is implemented to monitor traffic forwarded to and sent from applications running on VMs 502 within a server 500. In further detail, in the illustrated embodiment the Netflow traffic data is collected at one or more ports 504 of a NIC 506 using a Netflow collection agent 508, a Netflow export agent 510, and a Netflow collector 512.

Each of VMs 502 includes a virtual NIC 514 that implements a virtual function 516 and hosts a system image (SI) 518 running one or more applications 520, which are producers and/or consumers of network traffic that passes through ports 504 of NIC 506. As discussed above, a VMM or hypervisor, such as a hypervisor 522, implements a virtualization intermediary layer that provides a set of virtual system resources to each SI. The corresponding physical function is implemented to perform the actual physical network operation associated with the virtual functions 516, as depicted by physical function 524. FIG. 5 further depicts a 7-tuple data structure 526 used by Netflow collection agent 508.

Figure 6:
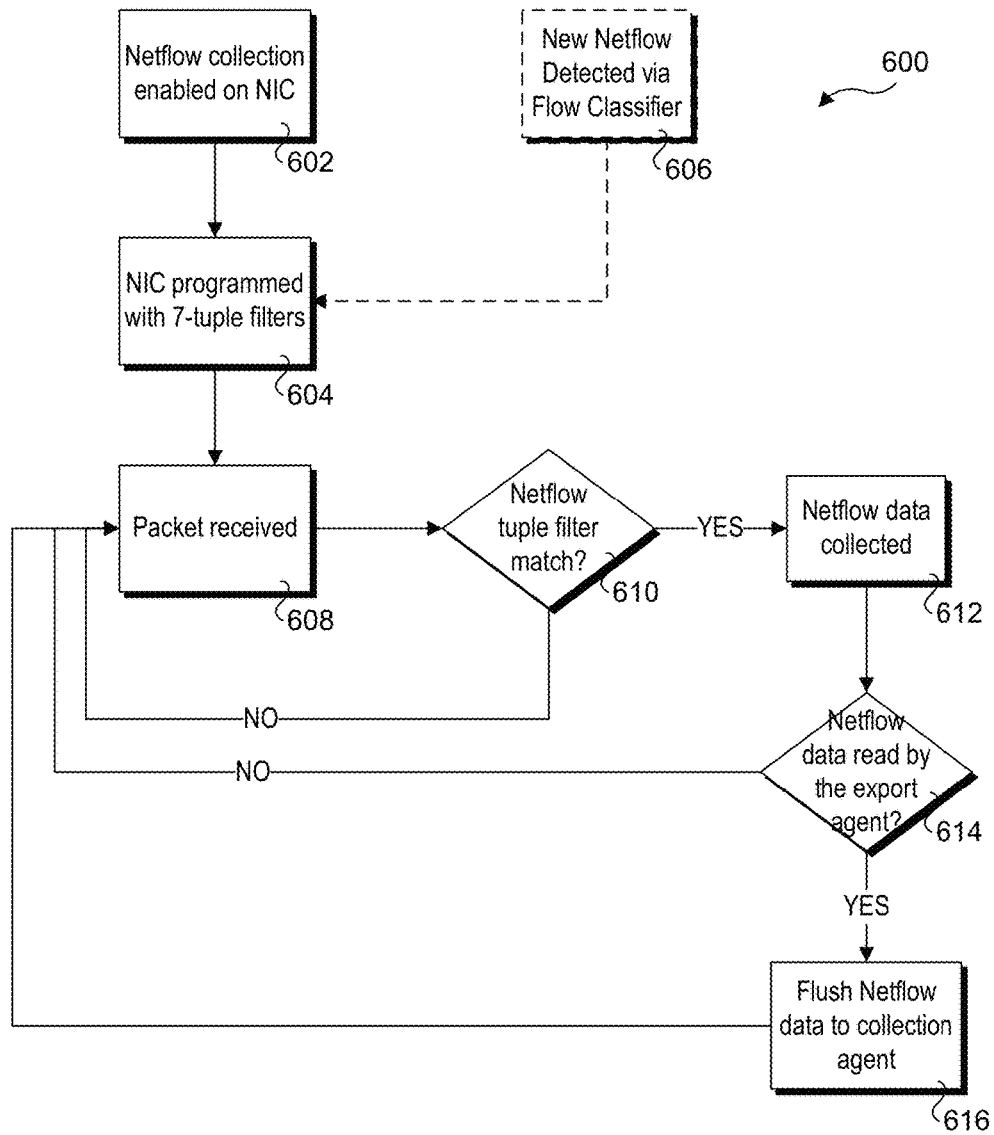
FIG. 6 is a flowchart illustrating operations and logic for collecting and exporting Netflow data, according to an embodiment employing a Netflow collection agent and a Netflow export agent.
Figure 7:
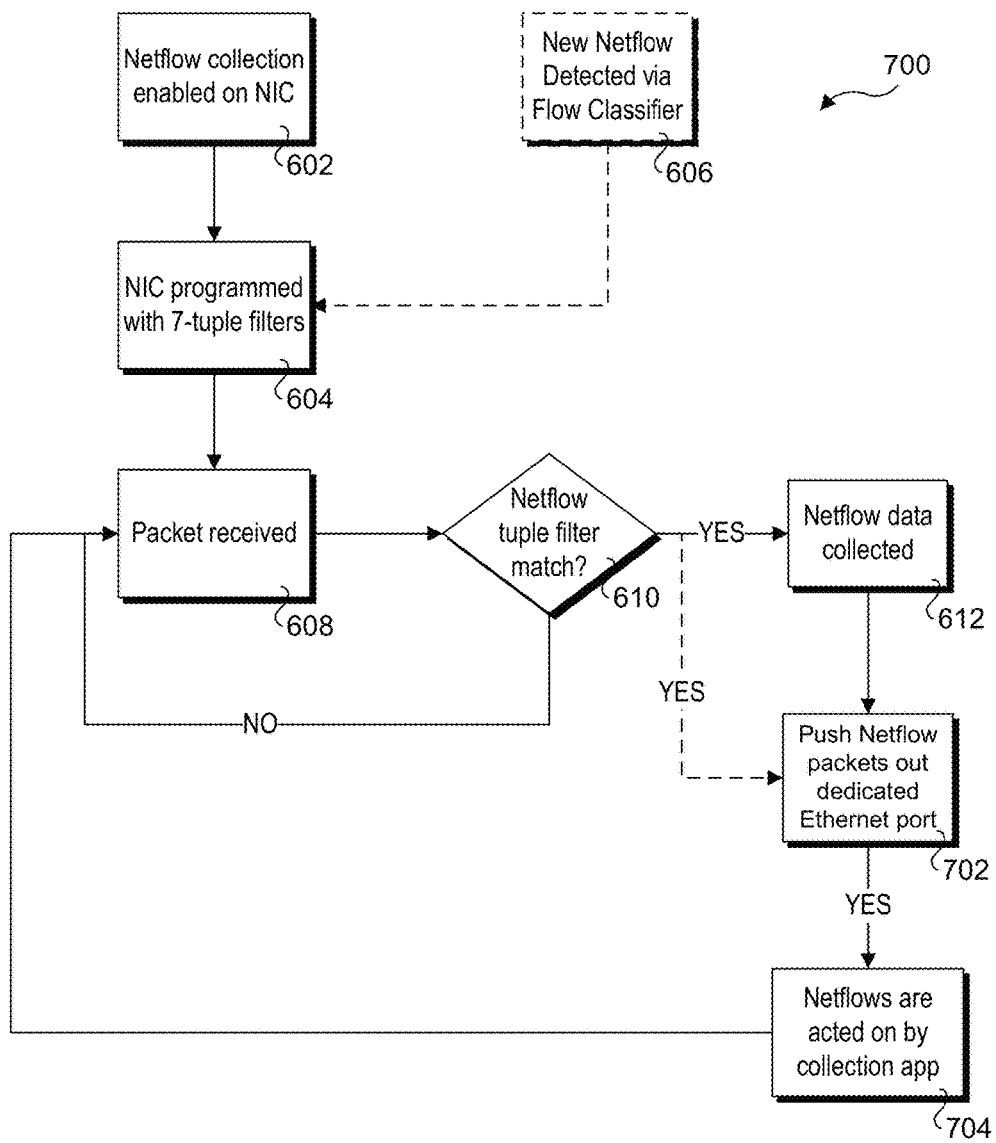
FIG. 7 is a flowchart illustrating operations and logic for collecting and forwarding Netflow data, according to an embodiment employing a Netflow collection agent without a Netflow export agent.

With further reference to a flowchart 600 of FIG. 6, in one embodiment Netflow data is captured and processed using NIC 506 in the following manner. In a block 602, static or dynamic configuration indicates that Netflow collection is enabled on the NIC. In a block 604, NIC 506 is programmed with 7-tuple filters corresponding to given flows to be collected. In one embodiment, as flow classifier or the like that is operated external to the NIC is used to detect new Netflows, and in response to detection of a new Netflow, the flow classifier (or an associated component) programs the NIC with a new 7-tuple filter. This is depicted in a block 606. Optionally, the detection of new Netflows can be performed using a flow classifier or the like that is implemented on the NIC.

In a block 608, a packet is received at Netflow data collection block 508, and a determination is made in a decision block 610 to whether a Netflow 7-tuple match is detected by comparing the 7-tuple field values in the packet header against the 7-tuple filters. As discussed above, the packet header field values may be extracted using a packet inspection logic that is separate from the Netflow collection agent, or packet inspection logic and the Netflow collection agent function may be incorporated into the same logic block. If there is a match, corresponding Netflow data is collected in a block 612. The collected Netflow data is periodically read by Netflow export agent 510 (or upon request or based on some other criteria), as depicted by a decision block 614. Generally, there are various known methods for securely passing the Netflow data from the NIC to the Netflow export agent. In highly secure environments, the Netflow export agent could run on the NIC firmware so the Netflow data is not available to any host applications. Optionally, the Netflow export agent may be implemented separate from NIC 506 (not shown).

In a block 616 the Netflow data that has been forwarded to the Netflow export agent is flushed to a Netflow collection agent, such as Netflow Collector collector 512. In the illustrated embodiment, Netflow export agent 510 forwards the Netflow data it has cached to Netflow collector 512 via UDP packets 530.

Under an alternative approach, collection of Netflow data is performed without using a Netflow export agent. In one embodiment, the operation and logic for implementing this approach is shown in flowchart 600 or FIG. 6. The operations of blocks 602, 604, 606, 608, 612, and decision block 610 are the same as that described above for flowchart 600. Under flowchart 700, the Netflow data collected in block 612 is pushed (as Netflow packets) out of a dedicated Ethernet port in a block 702 to a Neflow collection application that is configured to act on the Netflows, as depicted in a block 704. Optionally, packets containing collected Netflow data may be pushed to the Netflow collection application as each 7-tuple filter match is detected.

In addition to capturing Netflow information for packets received at an input port of NIC 506, similar operations to those shown in flowcharts 600 and 700 may be implemented for packet originating from VMs 502. For example, this is shown for an IP packet 532.

In addition to capturing Netflow data for packets passing through network ports, there are embodiments that capture Netflow data for packets that are exchanged between VMs within a platform. This includes an embodiment that employs a Single Root Virtual I/O (SR-IOV) architecture. To reduce the resource overhead associate with use of virtualization, PCI-SIG® developed the SR-IOV specification. The use of SR-IOV provides many benefits over the conventional virtualization intermediary approach, including providing the ability to eliminate VI involvement in main data movement actions, e.g., DMA, Memory space access, interrupt processing, etc.; elimination of VI interception and processing of each I/O operation; providing a standardized method to control SR-IOV resource configuration and management through a Single Root PCI Manager (SR-PCIM); providing the ability to reduce the hardware requirements and associated cost with provisioning potentially a significant number of I/O Functions within a device; and providing the ability to integrate SR-IOV with other I/O virtualization technologies such as Address Translation Services (ATS), Address Translation and Protection Table (ATPT) technologies, and interrupt remapping technologies to create robust, complete I/O virtualization solutions.

Figure 8:
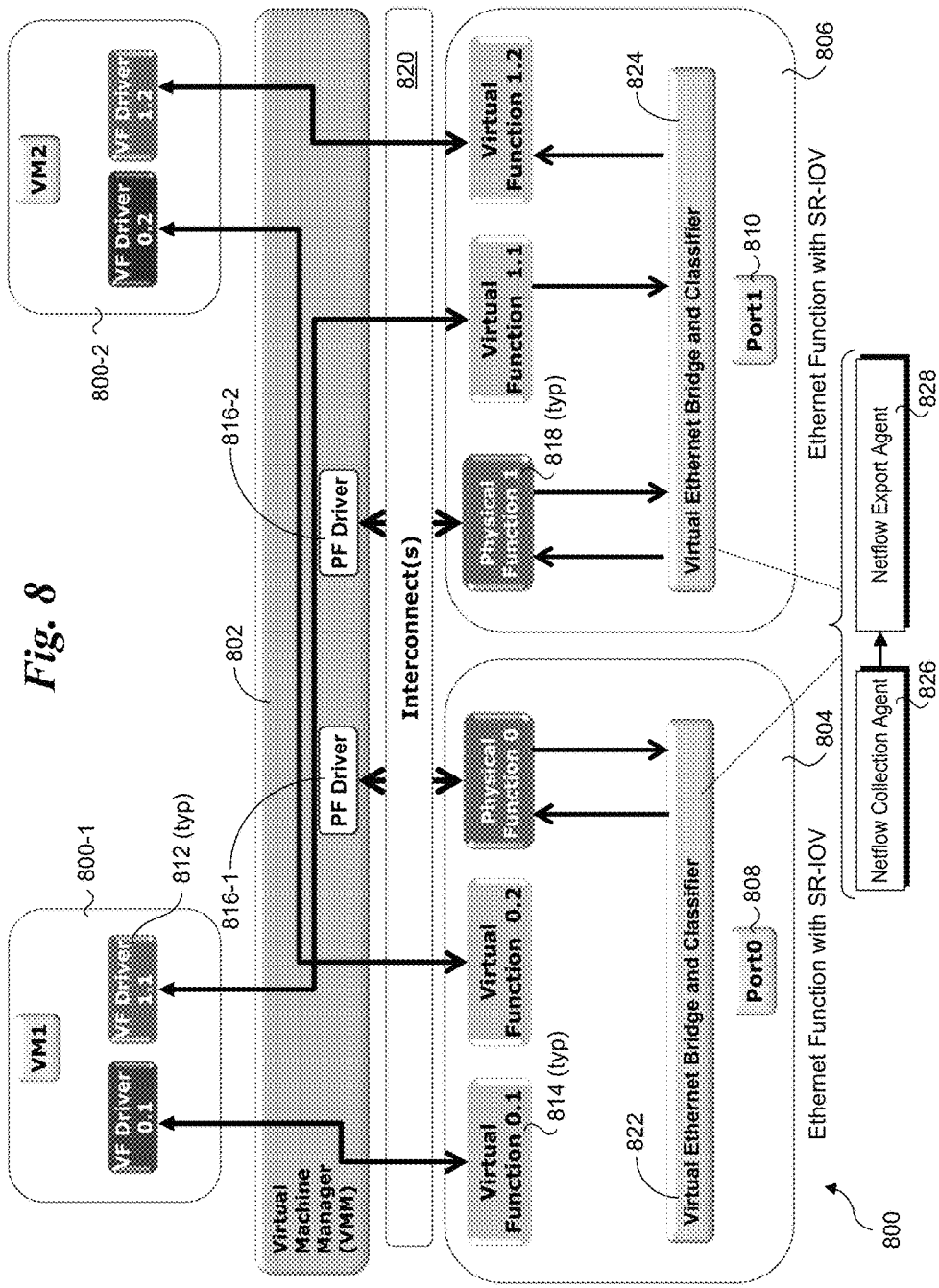
FIG. 8 is a schematic diagram of a platform employing an SR-IOV architecture configured to collection Netflow traffic, according to one embodiment.

An exemplary SR-IOV architecture 800 is depicted in FIG. 8. SR-IOV architecture 800 includes two VMs 800-1 and 800-2, a VMM 802, and a pair of Ethernet function with SR-IOV blocks 804 and 806, each including a respective port 808 (Port0) and 810 (Port1). Each of VMs 800-1 and 800-2 includes a pair of VF drivers 812 that interact with respective virtual functions 814 that are implemented in Ethernet function with SR-IOV blocks 804 and 806. The physical functions are implemented using PF drivers 816-1 and 816-2 in VMM 802, which interact with physical functions 818 in Ethernet function with SR-IOV blocks 804 and 806. Communication between the various components is facilitated by interconnects 820. As further shown, each of Ethernet function with SR-IOV blocks 804 and 806 includes a respective virtual Ethernet bridge and classifier 822 and 824 in which a Netflow collection agent 826 and a Netflow export agent 828 are implemented. Optionally, the Netflow export agent may be implemented via another component.

SR-IOV architecture 800 enables traffic to be forwarded between VMs 800-1 and 800-2 without using an external switch. Rather, logic in the virtual Ethernet bridge and classifiers 822 and 824 is configured to inspect each packet passing through physical functions 818 and determine whether the packet is to be sent out one or Port0 or Port1, or whether the packet is destined for another VM within the platform. By implementing Netflow collection agent 826 in this manner, the agent is enabled to gather Netflow data for both traffic that is forwarded within the platform, as well as traffic that is received by or is sent out from the platform.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

Figure 9:
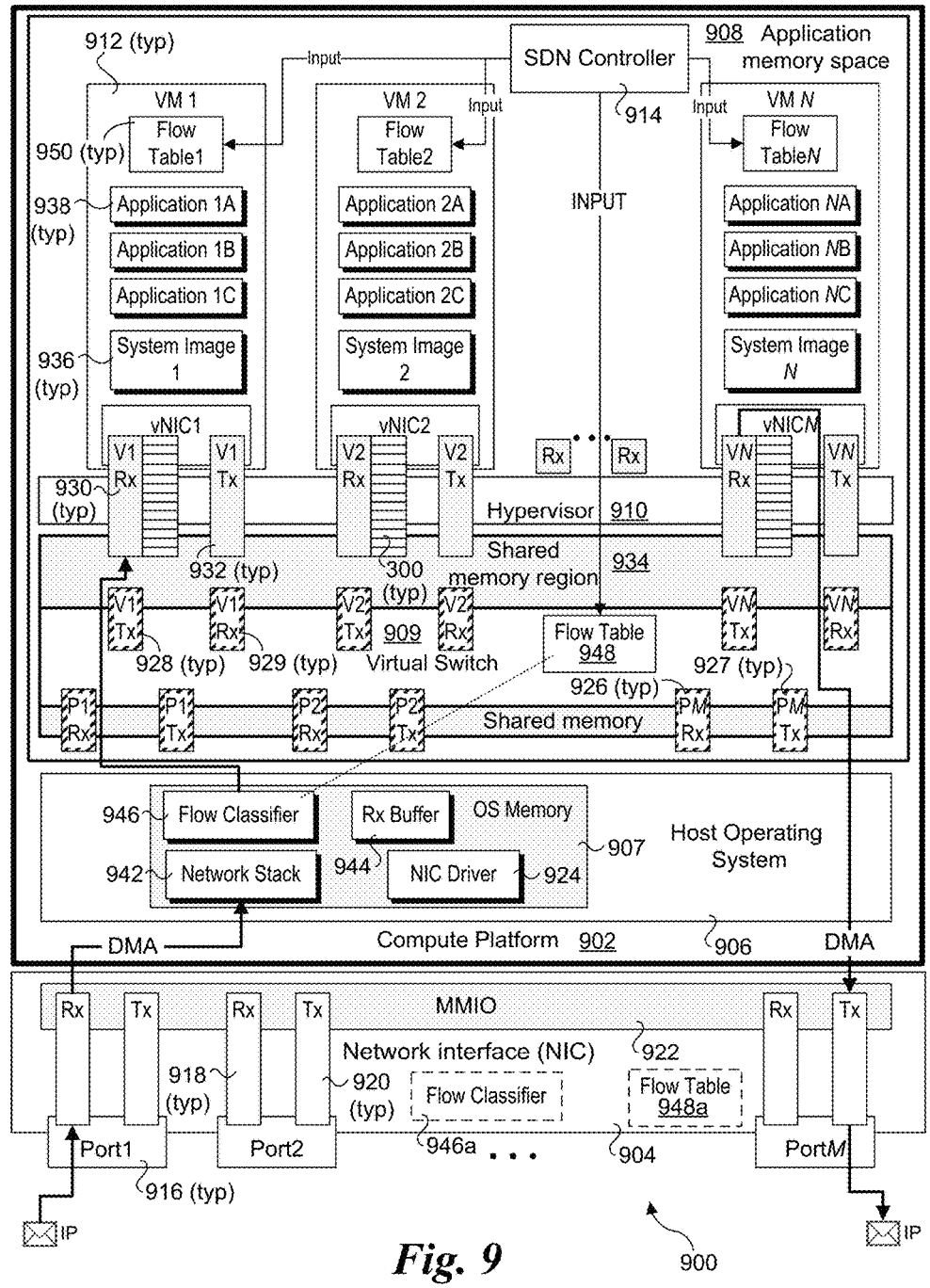
FIG. 9 is schematic diagram illustrating an architecture including virtual machines for a compute platform configured to support VM-to-VM traffic with a virtual switch.

FIG. 9 shows an architecture 900 for a compute node (e.g., compute platform such as a server) configured to perform packet processing operations through the use of SDN and NFV. Architecture 900 includes a compute platform 902 coupled to a network interface 904 that may be integrated on the compute platform (e.g., as a network interface controller (NIC)) or otherwise operatively coupled to the compute platform (e.g., as a PCIe (Peripheral Component Interconnect Express) card installed in a PCIe expansion slot). Compute platform 902 includes a host operating system (05) 906 running in OS memory 907 that is configured to host multiple applications running in an application memory space 908, which are depicted above host OS 906. This includes a virtual switch 909 and a hypervisor 910 that is configured to host N virtual machines 912, as depicted by virtual machines labeled VM 1, VM2 and VMN. The software components further include an SDN controller 914.

Network interface 904 includes M network ports 916 labeled Port1, Port2 . . . PortM, where M may be the same or different from N. Each network port 916 includes a receive (Rx) buffer 918 and a transmit (Tx) buffer 920. As used in the Figures herein, the Rx and Tx buffers and Rx and Tx queues that are depicted also may represent co-located Rx and Tx ports; to reduce clutter the Rx and Tx ports are not shown separately, but those skilled in the art will recognize that each Rx and Tx port will include one or more Rx and Tx buffers and/or queues.

Generally, a network interface may include relatively small Rx and Tx buffers that are implemented in the Rx and Tx ports, and then larger Rx and Tx buffers that may be implemented in input/output (JO) memory on the network interface that is shared across multiple Rx and Tx ports. In the illustrated example, at least a portion of the JO memory is memory-mapped JO (MMIO) 922 that is configured by a NIC driver 924 in OS memory 907 of host OS 906. MMIO 922 is configured to support direct memory access (DMA) data transfers between memory buffers in MMIO 922 and buffers in system memory on compute platform 902, as describe in further detail below.

Virtual switch 909 is a software-based entity that is configured to perform SDN switching operations internal to compute platform 902. In the illustrated example, virtual switch 908 includes a virtual Rx and Tx port for each physical Rx and Tx port on network interface 904 (e.g., for each of Port1-PortM), and a virtual Rx and Tx port for each of virtual machines VM 1-VM N. The virtual ports on the network interface side are depicted as Rx virtual ports 926 and Tx virtual ports 927, while the virtual ports on the VM side are depicted as Rx virtual ports 928 and Tx virtual ports 929. As further shown, a portion of each of Rx and Tx virtual ports 926, 927, 928, and 929 are depicted as overlapping a shared memory region 934 of the system memory address space (also referred to as a shared address space). Additionally, pairs of Rx and Tx virtual ports 930 and 932 are further depicted as extending into a respective virtual NIC (vNIC), as shown by vNIC1, vNIC2 and vNICN, wherein the vNICs are associated with respective virtual machines VM 1, VM 2 and VM N.

Each of virtual machines VM 1, VM 2, and VM N is shown including a system image 936 and three applications 938 with indicia identifying the corresponding VM the system images and applications are running on. For example, for VM 1 the system image is labeled "System Image 1" and the applications are labeled "Application 1A," "Application 1B," and "Application 1C." Generally, each system image 936 may run one or more applications 938, and the inclusion of three applications is merely for illustrative purposes.

Architecture 900 further depicts a network stack 942, an Rx buffer 944, a flow classifier 946 and a flow table 948 and flow tables 950. In addition, NIC 904 may include a flow classifier 946a and/or a flow table 948a.

Generally, packet header inspection may be done using one or more of the following schemes. In one embodiment, packets are DMA'ed (e.g., using a DMA write operation) from Rx buffers in port 916 into an Rx buffer 944 in OS memory 907. For example, in one embodiment memory spaces in the NIC port Rx buffers are allocated for FIFO (First-in, First-out) queues that employ circular FIFO pointers, and the FIFO head pointer points to the packet that is DMA'ed into Rx buffer 944. As an alternative, only the packet header is DMA'ed into Rx buffer 944. As yet another option, the packet header data is read "in place" without copying either the packet data or header into Rx buffer 944. In this instance, the packet header data for a small number of packets is read into a buffer associated with network stack 942 or a flow classifier 946 in host OS 906. Similarly, for flow classification that is performed by network interface 904 the packet header data may be read in place; however, in this instance the buffer is located in memory on network interface 904 that will typically be separate from MMIO 922 (not shown).

The result of flow classification returns a flow identifier (flow ID) for the packet. In one embodiment, the flow ID is added to a packet header field for packets that are received without an explicit flow ID, or, alternatively, a flow ID tag is attached to (e.g., prepended) or the packet is encapsulated in a "wrapper" that includes a field for the flow ID.

As shown in FIG. 9, in the illustrated embodiment packet classification is performed by flow classifier 946. Optionally, flow classification may be performed in network interface 904 via a similar flow classifier 946a. In one embodiment, a split classification scheme is implemented under which existing flows (e.g., previously classified flows) are identified in network interface 904 by flow classifier 946a, while packets that don't belong to an existing flow are forwarded to flow classifier 946 for packet classification corresponding to a new packet flow. Information for the new packet flow is then provided to flow classifier 946a. Under another embodiment, the list of classified flows maintained by a flow classifier 946a is less than a complete list maintained by flow classifier 946, and operates similar to a memory cache where flows pertaining to more recent packets are maintained in flow classifier 946a on the NIC and flows for less recent packets are replaced.

The flow IDs are used as lookups into flow table 948, which is depicted as being part of virtual switch 909. In one embodiment, the flow table contains a column of flow ID's and a column of vNIC Rx port IDs such that given an input flow ID, the lookup will return a corresponding vNIC Rx port ID. In one embodiment, all or a portion of the data in flow table 948 is copied to flow tables 950 in the VMs.

In addition to flow table 948 being implemented in virtual switch 909, all or a portion of the flow table may be implemented in host OS 906 or network interface 904 (neither of which is shown in FIG. 9). In embodiments employing all or a portion of a flow table in network interface 904, the flow table entries will generally be determined by software in host OS 906 and populated via an interface provided by NIC driver 924.

Figure 9A:
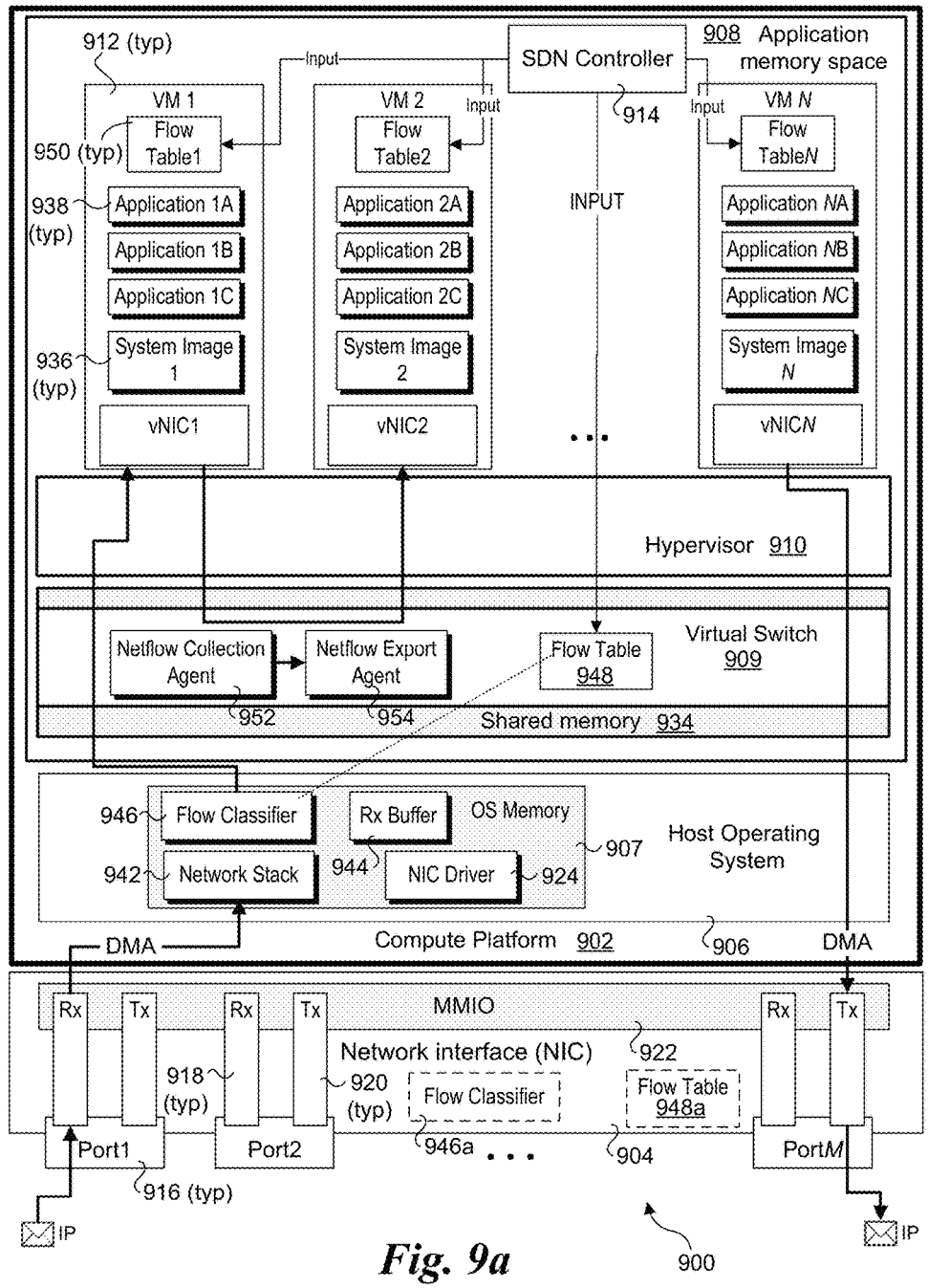
FIG. 9*a* is schematic diagram illustrating an abstracted version of FIG. 9, further adding components for implementing Netflow collection and export operations, according to one embodiment.

FIG. 9a shows an abstracted view of FIG. 9, while further showing details for implementing Netflow data collection for traffic that passes through virtual switch 909. This includes Netflow collection agent 950 and a Netflow export agent 952. In one embodiment, Netflow collection agent 950 interfaces with an applicable flow classifier to receive packet header information. In another embodiment, a flow classifier is configured to detect new Netflows, and to generated corresponding 7-tuple filters that are to be implemented in Netflow collection agent 950.

In addition to capturing Netflow data at virtual ports in a virtual switch, Netflow data may also be captured at buffers and/or queues implemented for the vNICs.

Figure 5A:
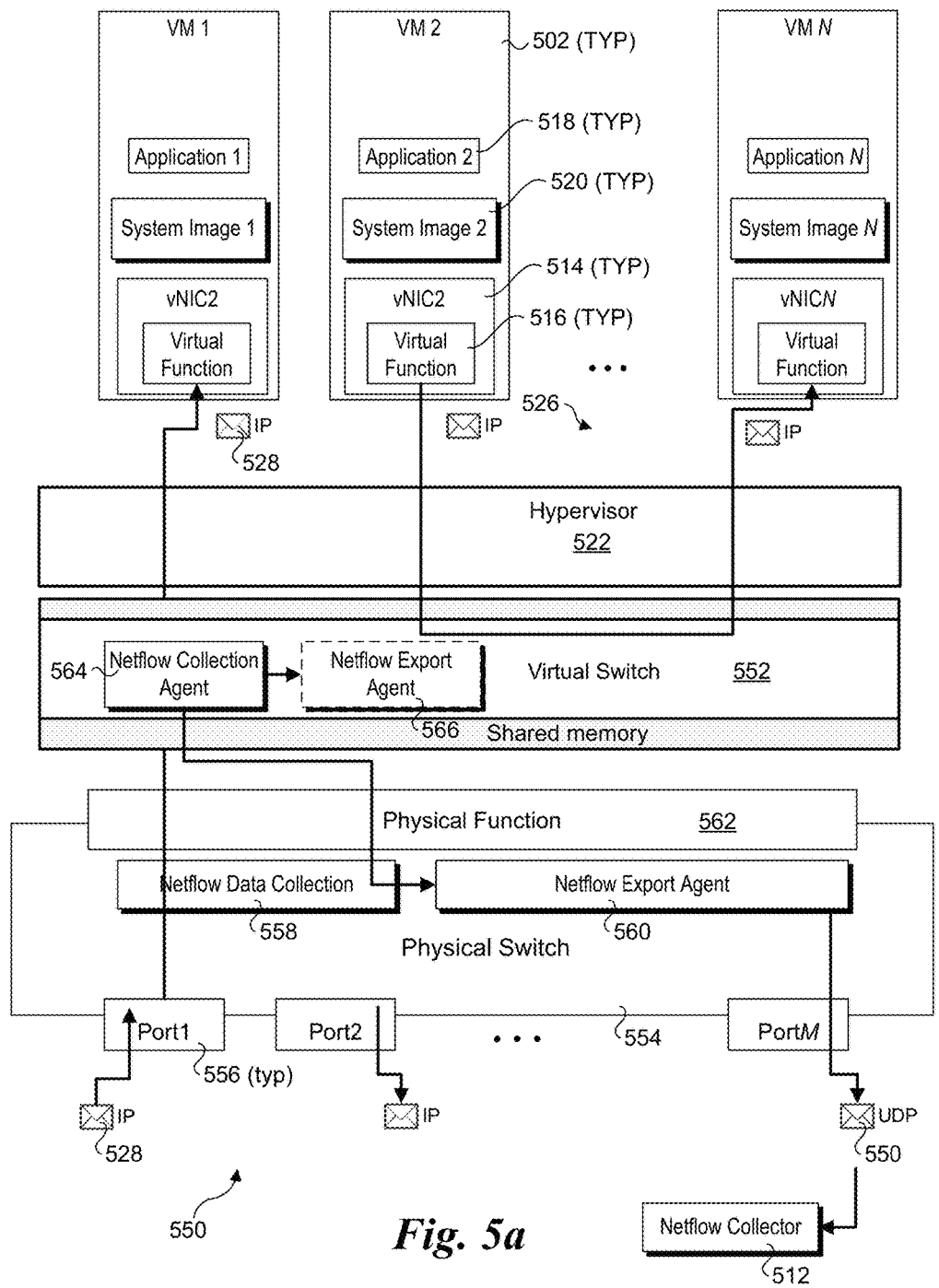
FIG. 5*a* is a schematic diagram illustrating one embodiment of a Netflow data capture scheme that is implemented to monitor VM-to-VM traffic and offload export of Netflow data using an accelerated vSwitch.

FIG. 5a shows a sled 550 that supports VM-to-VM switching through the use of a virtual switch 552. The VM-related components in server 550 and sled 550 are similar and share the same reference numbers, including virtual NICs 514, virtual functions 516, system images 518, applications 520, and hypervisor 522. Sled 550 further includes a physical switch 554 having multiple ports 556, and including a Netflow collection agent 558 and a Netflow export agent 560, both implemented in hardware. Optionally, the Netflow export agent may be implemented separate from the physical switch (or not at all for embodiments that do not employ a Netflow export agent). A physical function block 562 corresponds to the physical switching function supported by physical switch 554.

In one embodiment, the Netflow collection agent and Netflow Export agent functions are implemented in software on virtual switch 552, as shown by a Netflow collection agent 564 and a Netflow export agent 566. Under an alternative accelerated Vswitch configuration, Netflow Export agent 560 operates as a Netflow export agent for both traffic passing through physical switch 554 and VM-to-VM traffic traversing virtual switch 552.

Figure 10:
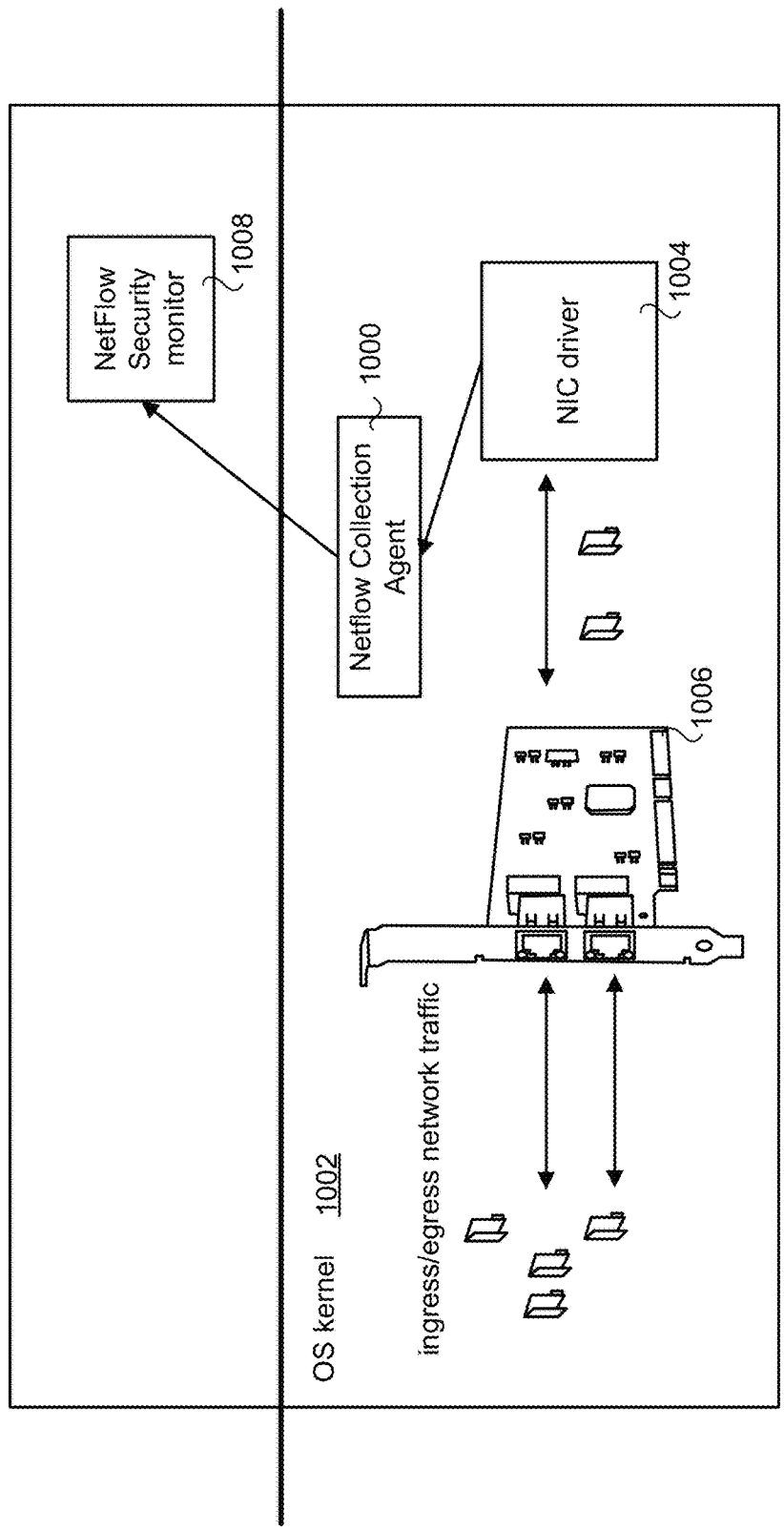
FIG. 10 is a schematic diagram of an embodiment that employs a Netflow collection agent in an operating system kernel to collect Netflow data.

FIG. 10 shows one embodiment implementing Netflow collection using a Netflow collection agent 1000 running in an operating system (OS) kernel 1002. Also running in the OS kernel is a NIC driver 1004. NIC driver 1004 is configured to pass packet inspection tuples corresponding to network traffic traversing a NIC 1006 to Netflow collection agent 1000. Netflow collection agent 1000 collects Netflow data and sends the Netflow data to a Netflow security monitor 1008 that is external to the platform NIC 1006 is installed in.

Figure 11:
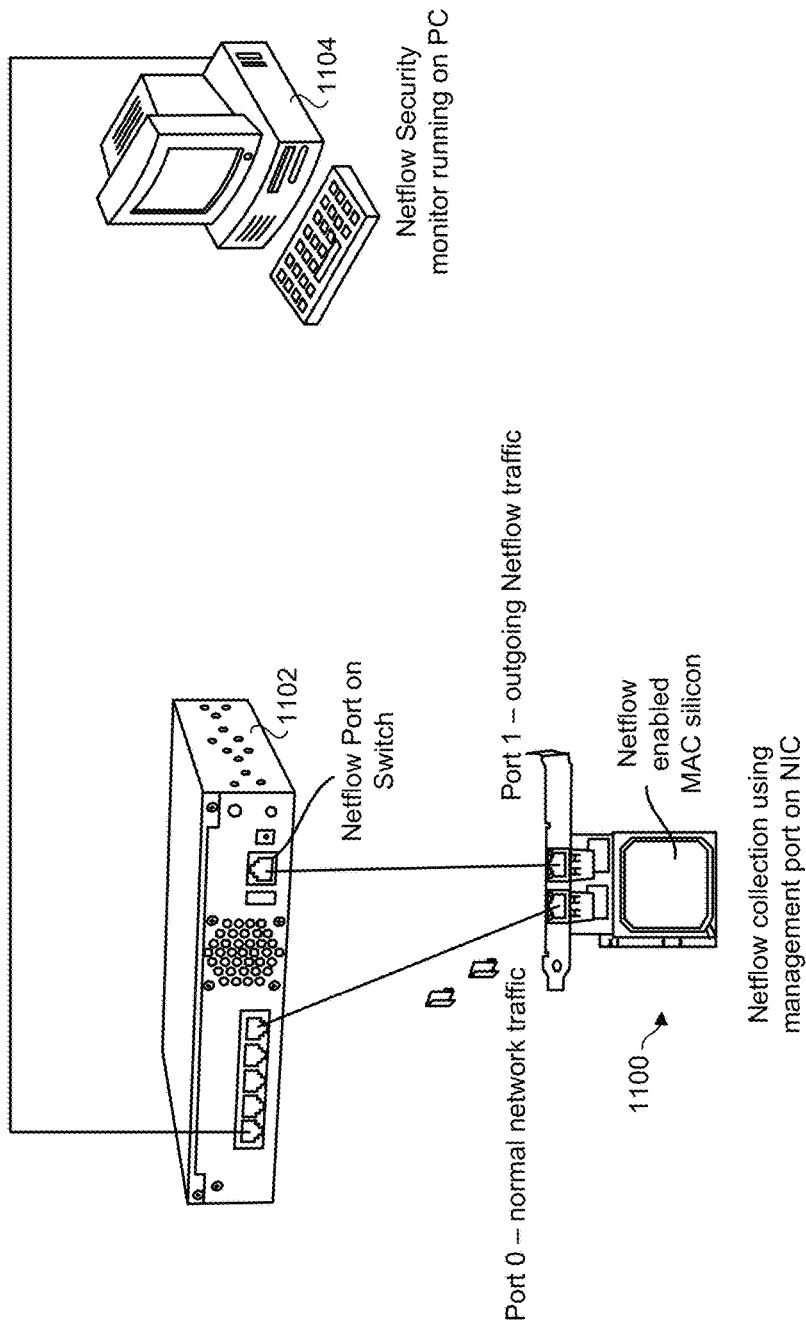
FIG. 11 is a schematic diagram illustrating Netflow data collection enabled in the MAC silicon of a NIC and using a dedicated management port to forward collected Netflow data to a Netflow port on a Netflow-enabled switch.

FIG. 11 shows packet flows for an embodiment that performs Netflow collection using a management port on a NIC 1100, which includes a Port 0 used for normal network traffic, and a management port 1 used for outgoing Netflow traffic. The Netflow data is gathered via functionality embedded in the MAC silicon (i.e., hardware) of NIC 1100. The collected Netflow data is forwarded as packets to a Netflow port on a switch 1102, which in one embodiment is a ToR switch. Switch 1102 forwards the collected Netflow data to a Netflow Security monitor application running on a PC 1104.

Figure 12:
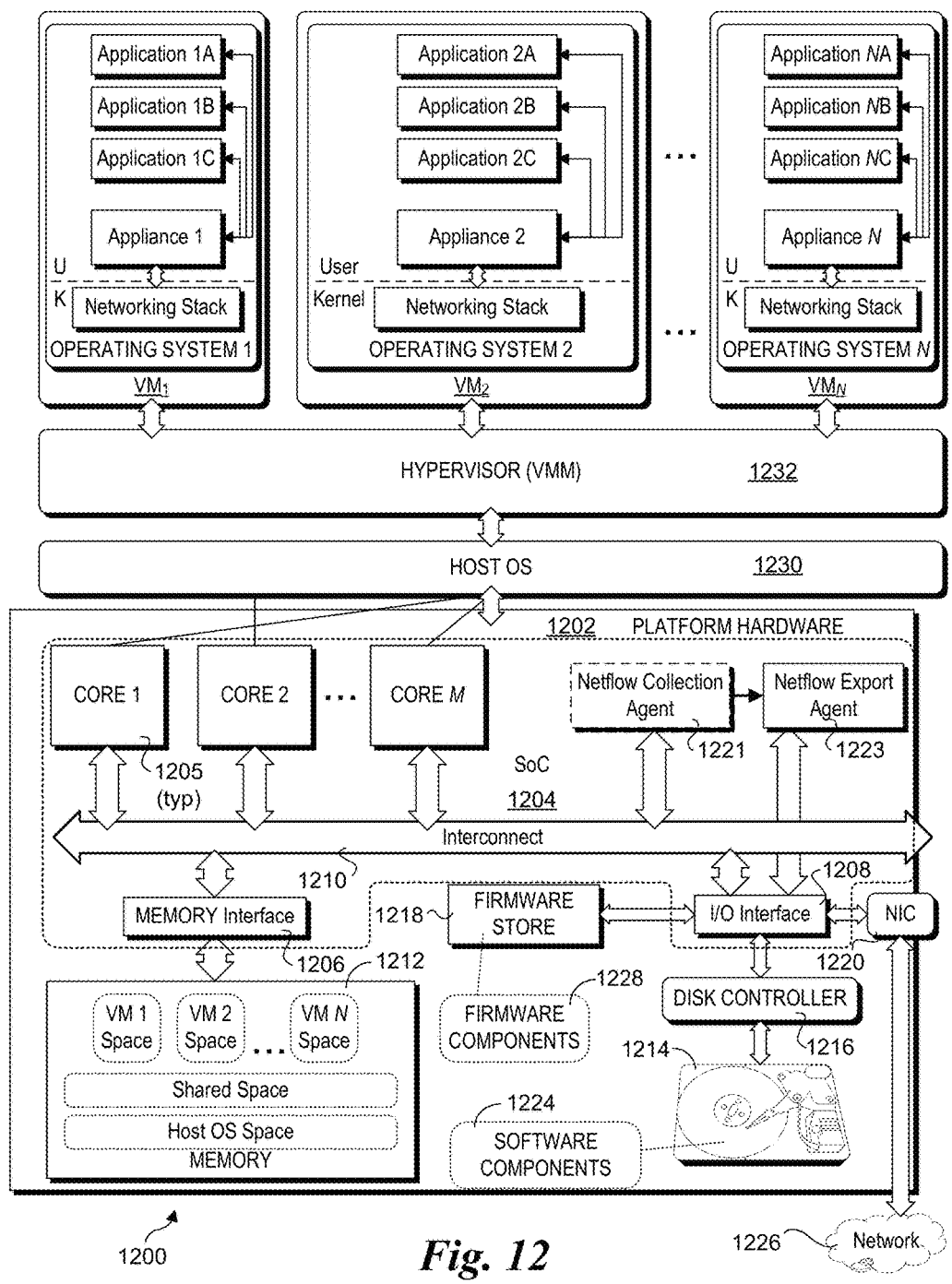
FIG. 12 is a schematic diagram of a host platform hardware and software architecture including an SoC in which a Netflow collection agent and Netflow export agent are implemented.

FIG. 12 shows an exemplary host platform configuration 1200 including platform hardware 1202 and various software-based components. Platform hardware 1202 includes a processor comprising a System on a Chip (SoC) 1204 coupled to a memory interface 1206 and an input/output (I/O) interface 1208 via an interconnect 1210. Memory interface 1206 is configured to facilitate access to system memory 1212, which will usually be separate from the SoC.

Interconnect 1210 may comprise an interconnect hierarchy of multiple interconnect structures, with at least one level in the interconnect hierarchy comprising a coherent interconnect.

I/O interface 1208 is illustrative of various I/O interfaces provided by platform hardware 1202. Generally, I/O interface 1208 may be implemented as a discrete component (such as an ICH (I/O controller hub) or the like), or it may be implemented on an SoC. Moreover, I/O interface 1208 may also be implemented as an I/O hierarchy, such as a Peripheral Component Interconnect Express (PCIe™) I/O hierarchy. I/O interface 1208 further facilitates communication between various I/O resources and devices and other platform components. These include a non-volatile storage device, such as a disk drive 1214 that is communicatively coupled to I/O interface 1208 via a disk controller 1216, a firmware store 1218, a NIC 1220, and various other I/O devices. In addition, SoC 1204 further includes a Netflow collection agent 1221 and a Netflow export agent 1223. In some embodiments, firmware store is external to SoC 1204, while in other embodiments at least a portion of the SoC firmware is stored on Soc 1204.

In general, Soc 1204 may comprise a single core processor or a multi-core processor, such as depicted by M cores 1205. The multiple cores are employed to execute various software components 1224, such as modules and applications, which are stored in one or more non-volatile storage devices, as depicted by disk drive 1214. More generally, disk drive 1214 is representative of various types of non-volatile storage devices, including both magnetic- and optical-based storage devices, as well as solid-state storage devices, such as solid state drives (SSDs) or Flash memory. Optionally, all or a portion of software components 1224 may be stored on one or more storage devices (not shown) that are accessed via a network 1226.

During boot up or run-time operations, various software components 1224 and firmware components 1228 are loaded into system memory 1212 and executed on cores 1205 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 1202, firmware 1228 will be loaded and configured in system memory 1212, followed by booting a host OS 1230. Subsequently, a hypervisor 1232, which may generally comprise an application running on host OS 1230, will be launched. Hypervisor 1232 may then be employed to launch various virtual machines, $VM_{1-N}$, each of which will be configured to use various portions (i.e., address spaces) of system memory 1212. In turn, each virtual machine $VM_{1-N}$ may be employed to host a respective operating system $1234_{1-N}$.

During run-time operations, hypervisor 1232 enables reconfiguration of various system resources, such as system memory 1212, cores 1205, and disk drive(s) 1214. Generally, the virtual machines provide abstractions (in combination with hypervisor 1232) between their hosted operating system and the underlying platform hardware 1202, enabling the hardware resources to be shared among $VM_{1-N}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 1232.

As further illustrated in FIG. 12, each operating system includes a kernel space and a user space, both of which are implemented as memory spaces in system memory 1212. The kernel space is protected and used to run operating system kernel components, including a networking stack. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 1202. For simplicity, each $VM_{1-N}$ is depicted as hosting a similar set of software applications; however, this is merely for illustrative purposes, as the VMs for a given platform may host similar applications, or may host different applications. Similarly, each $VM_{1-N}$ may host a single virtual network appliance (as shown), may host multiple virtual network appliances, or may not host any virtual network appliances.

Netflow collection agent 1221 is configured to collect Netflow data relating to and traffic that is transferred between the various appliances and application running on the VMs. Optionally, Netflow collection agent 1221 may also monitor traffic that traverses ports on NIC 1220. Netflow export agent 1223 operates in a manner similar to the Netflow export agents discussed above. In some embodiments, SoC 1204 will include a Netflow collection agent, while the Netflow export agent will be external to the SoC. In some embodiments, the Netflow collection agent is implemented in software running on the host platform (e.g., in a virtual switch, as described above with reference to FIG. 5, and the Netflow export agent aggregates Netflow data generated by the Netflow collection agent and forwards the Netflow data to a Netflow collector that is external to the host platform.

In one embodiment, Netflow collection agent 1221 and/or Netflow export agent 1223 are implemented via firmware instructions that are executed on one or more of cores 1205. In another embodiment, Netflow collection agent 1221 and/or Netflow export agent 1223 are implemented via embedded logic. In one embodiment, the embedded logic comprises instructions stored on SoC 1204 that are executed on an embedded processor or the like (not shown).

The various embodiments described herein support collection of Netflow data at various levels in the data center hierarchy, from the tray or sub-rack level all the way down to collection of Netflow data relating to data exchanged among VMs in individual servers. This greatly extends the collection of Netflow data, providing insights into network traffic that would otherwise go undetected under the conventional approach requiring Cisco network components to collect the Netflow data.

Further aspects of the subject matter described herein are set out in the following numbered clauses:

1. A method for collecting Netflow data via functionality implemented in a hardware component of a network device, the method comprising:

programming the hardware component with a plurality of 7-tuple filters, each 7-tuple filter defining a set of 7 packet header field values defining a respective Netflow;

detecting, via the hardware component, whether a packet belongs to a given Netflow using the plurality of 7-tuple filters;

if a 7-tuple filter match is detected, adding data associated with the packet to Netflow data for the Netflow corresponding to the 7-tuple filter match;

collecting, via the hardware component, Netflow data for a plurality of Netflows; and forwarding the Netflow data that is collected to one of a Netflow export agent and a Netflow collector.

2. The method of clause 1, wherein the network device is a Network Interface Controller (NIC).

3. The method of clause 2, wherein the network device comprises a switch.

4. The method of clause 3, wherein the switch comprises a disaggregated switch

5. The method of clause 3, wherein the switch comprises a backplane switch.

6. The method of any of the preceding clauses, wherein the network device comprises an accelerated virtual switch.

7. The method of any of the preceding clauses, wherein the Netflow data is collected at a Physical Function (PF) layer.

8. The method of any of the preceding clauses, wherein the Netflow data is collected at a Virtual Function layer.

9. The method of any of the preceding clauses, wherein the network device is implemented in an apparatus hosting multiple virtual machines (VMs), and the Netflow data that is collected includes Netflow data relating to VM-to-VM traffic that is forwarded between VMs operating within the apparatus.

10. The method of clause 9, wherein the apparatus includes a processor that includes embedded logic for implementing a Netflow export agent, the method further comprising implementing the Netflow export agent to forward Netflow data relating to the VM-to-VM traffic to a Netflow collector that is external to the apparatus.

11. The method of any of the preceding clauses, wherein the network device employs a Single Root Virtual I/O (SR-IOV) architecture, and the Netflow data is collected in an Ethernet function block.

12. An apparatus, comprising:
a network device, including a plurality of ports, the network device including embedded logic for performing operations relating to the collection of Netflow data for packets passing through at least one of the plurality of ports when the apparatus is operating, the operations including,
detecting whether a packet belongs to a given Netflow using a plurality of 7-tuple filters;
if a 7-tuple filter match is detected, adding data associated with the packet to Netflow data for the Netflow corresponding to the 7-tuple filter match;
collecting Netflow data for a plurality of Netflows; and
forwarding the Netflow data that is collected to one of a Netflow export agent and a Netflow collector.

13. The apparatus of clause 12, wherein the apparatus further comprises embedded logic for implementing a Netflow export agent, and the operations further comprise:
forwarding the Netflow data that is collected to the Netflow export agent; and
forwarding Netflow data from the Netflow export agent to a Netflow collector that is external to the apparatus.

14. The apparatus of clause 12, wherein the network device comprises a Network Interface Controller (NIC).

15. The apparatus of clause 14, wherein the NIC includes a plurality of ports, and wherein one of the plurality of ports is dedicated to forwarding Netflow data to a Netflow collector.

16. The apparatus of clause 12, wherein the apparatus comprises one of a server chassis including at least one server and a sled including a plurality of servers, and wherein the network device comprises a backplane switch.

17. The apparatus of clause 12, wherein the apparatus comprises one of a server chassis including at least one server and a sled including a plurality of servers, and wherein the network device comprises a disaggregated switch.

18. The apparatus of clause 12, wherein the network device is implemented in an apparatus hosting multiple virtual machines (VMs), and the Netflow data that is collected include data relating to VM-to-VM traffic that is forwarded between VMs operating within the apparatus.

19. The apparatus of clause 12, wherein the network device employs a Single Root Virtual I/O (SR-IOV) architecture, and the Netflow data is collected in an Ethernet function block.

20. The apparatus of clause 12 wherein the Netflow data is collected at a network port queue port of the network device.

21. The apparatus of clause 12, wherein the apparatus is configured to support a virtualized execution environment, and Netflow data is collected at a Physical Function (PF) layer of the virtualized execution environment.

22. The apparatus of clause 12, wherein the apparatus is configured to support a virtualized execution environment, and Netflow data is collected at a Virtual Function layer (VF) layer of the virtualized execution environment.

23. An apparatus comprising:
At least one processor, having a plurality of cores;
memory, operatively coupled to the plurality of cores;
a storage device, in which software instructions are stored; and
a physical network switch communicatively coupled to the processor,
wherein the software instructions are configured to be executed on one or more of the plurality of cores to perform operations including,
implementing a hypervisor configured to host a plurality of virtual machines (VMs)
implementing a virtual switch having a plurality of virtual ports communicatively coupled to the plurality of VMs, which is configured to enable network traffic to be forwarded between the VMs without leaving the apparatus;
configuring at least one virtual port in the virtual switch with a plurality of 7-tuple filters, each 7-tuple filter defining a set of 7 packet header field values defining a respective Netflow;
detecting whether a packet received at or sent out from the at least one virtual port belongs to a given Netflow using the plurality of 7-tuple filters;
if a 7-tuple filter match is detected, adding data associated with the packet to Netflow data for the Netflow corresponding to the 7-tuple filter match; and
collecting Netflow data for a plurality of Netflows traversing the virtual switch.

24. The apparatus of clause 23, wherein a Netflow collection agent is implemented in the virtual switch that is configured to forward Netflow data to a Netflow export agent implemented in the physical network switch.

25. The apparatus of clause 24, wherein the Netflow export agent is further configured to transfer Netflow data that is collected via an output port on the physical switch to a Netflow collector.

26. The apparatus of clause 23, wherein the physical network switch is further configured to collect Netflow data for network traffic received at or sent out from at least one port on the physical network switch.

27. The apparatus of clause 23, wherein the at least one processor includes a processor System on a Chip (SoC) that includes embedded logic for implementing a Netflow export agent function.

28. An apparatus, comprising:
a network device, including a plurality of ports, the network device including means for performing operations relating to the collection of Netflow data for packets passing through at least one of the plurality of ports when the apparatus is operating, the apparatus including,
means for detecting whether a packet belongs to a given Netflow using a plurality of 7-tuple filters;
means for, if a 7-tuple filter match is detected, adding data associated with the packet to Netflow data for the Netflow corresponding to the 7-tuple filter match;
means for collecting Netflow data for a plurality of Netflows; and
means for forwarding the Netflow data that is collected to one of a Netflow export agent and a Netflow collector.

29. The apparatus of clause 28, wherein the apparatus further comprises means for implementing a Netflow export agent, and the operations further comprise:
forwarding the Netflow data that is collected to the Netflow export agent; and
forwarding Netflow data from the Netflow export agent to a Netflow collector that is external to the apparatus.

30. The apparatus of clause 28, wherein the network device comprises a Network Interface Controller (NIC).

31. The apparatus of clause 30, wherein the NIC includes a plurality of ports, and wherein one of the plurality of ports is dedicated to forwarding Netflow data to a Netflow collector.

32. The apparatus of clause 30, wherein the network device is implemented in an apparatus hosting multiple virtual machines (VMs), and the Netflow data that is collected include data relating to VM-to-VM traffic that is forwarded between VMs operating within the apparatus.

33. The apparatus of clause 28, wherein the apparatus is configured to support a virtualized execution environment, and Netflow data is collected at a Physical Function (PF) layer of the virtualized execution environment.

34. The apparatus of clause 28, wherein the apparatus is configured to support a virtualized execution environment, and Netflow data is collected at a Virtual Function layer (VF) layer of the virtualized execution environment.

35. A System of a Chip (SoC), comprising:
a plurality of processor cores operatively coupled to an interconnect comprising one or more interconnect structures in an interconnect hierarchy;
a memory controller, operatively coupled to the plurality of cores via the interconnect;
in input/output (I/O) interface, operatively coupled to the interconnect; and
means for implementing at least one of a Netflow collection agent and a Netflow export agent.

36. The SoC of clause 35, wherein the SoC further includes a firmware store including instructions configured to be executed by one or more of the processor cores to implement the at least one of a Netflow collection agent and a Netflow export agent.

37. The SoC of clause 35, wherein the means for implement the at least one at least one of a Netflow collection agent and a Netflow export agent comprises embedded logic.

38. The SoC of clause 35, wherein the SoC is configured to be implemented in an apparatus including:
memory, operatively coupled to the memory controller;
a storage device, in which software instructions are stored; and
a physical network switch communicatively coupled to the SoC;
wherein the software instructions are configured to be executed on one or more of the plurality of cores to perform operations including,
implementing a hypervisor configured to host a plurality of virtual machines (VMs)
implementing a virtual switch having a plurality of virtual ports communicatively coupled to the plurality of VMs, which is configured to enable network traffic to be forwarded between the VMs without leaving the apparatus;
configuring at least one virtual port in the virtual switch with a plurality of 7-tuple filters, each 7-tuple filter defining a set of 7 packet header field values defining a respective Netflow;
detecting whether a packet received at or sent out from the at least one virtual port belongs to a given Netflow using the plurality of 7-tuple filters; and
if a 7-tuple filter match is detected, adding data associated with the packet to Netflow data for the Netflow corresponding to the 7-tuple filter match,
wherein the Netflow export agent is configured to receive the Netflow data and export the Netflow data to a Netflow collector external to the apparatus.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by a host processor or an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for collecting Netflow data via functionality implemented in a chip of a network device, the method comprising:
    programming the hardware component with a plurality of 7-tuple filters, each 7-tuple filter defining a set of 7 packet header field values defining a respective Netflow;
    for each of a plurality of packets that do not contain network metadata,
        detecting, via the hardware component, whether a packet belongs to a given Netflow using the plurality of 7-tuple filters;
        if a 7-tuple filter match is detected, adding data associated with the packet to Netflow data for the Netflow corresponding to the 7-tuple filter match;
    collecting, via the hardware component, Netflow data for a plurality of Netflows; and
    forwarding the Netflow data that is collected to one of a Netflow export agent and a Netflow collector.

2. The method of claim 1, wherein the network device is a Network Interface Controller (NIC).

3. The method of claim 1, wherein the network device comprises a switch.

4. The method of claim 3, wherein the switch comprises a disaggregated switch.

5. The method of claim 3, wherein the switch comprises a backplane switch.

6. The method of claim 1, wherein the Netflow data is collected at a Physical Function (PF) layer.

7. The method of claim 1, wherein the network device employs a Single Root Virtual I/O (SR-IOV) architecture, and the Netflow data is collected in an Ethernet function block.

8. The method of claim 1, wherein the Netflow data for the Netflow corresponding to the 7-tuple filter match is a Netflow Flow record in a Netflow cache that includes one or more key fields and a length of a flow corresponding to the 7-tuple filter match.

9. An apparatus, comprising:
a network device, including a plurality of ports, the network device including a chip having embedded logic for performing operations relating to the collection of Netflow data for packets passing through at least one of the plurality of ports when the apparatus is operating, the operations including,
for each of a plurality of packets that do not contain network metadata,
detecting whether a packet belongs to a given Netflow using a plurality of 7-tuple filters;
if a 7-tuple filter match is detected, adding data associated with the packet to Netflow data for the Netflow corresponding to the 7-tuple filter match;
collecting Netflow data for a plurality of Netflows; and
forwarding the Netflow data that is collected to one of a Netflow export agent and a Netflow collector.

10. The apparatus of claim 9, wherein the embedded logic further comprises embedded logic for implementing a Netflow export agent, and the operations further comprise:
forwarding the Netflow data that is collected to the Netflow export agent; and
forwarding Netflow data from the Netflow export agent to a Netflow collector that is external to the apparatus.

11. The apparatus of claim 9, wherein the network device comprises a Network Interface Controller (NIC).

12. The apparatus of claim 11, wherein the NIC includes a plurality of ports, and wherein one of the plurality of ports is dedicated to forwarding Netflow data to a Netflow collector.

13. The apparatus of claim 9, wherein the apparatus comprises one of a server chassis including at least one server and a sled including a plurality of servers, and wherein the network device comprises a backplane switch.

14. The apparatus of claim 9, wherein the apparatus comprises one of a server chassis including at least one server and a sled including a plurality of servers, and wherein the network device comprises a disaggregated switch.

15. The apparatus of claim 9, wherein the network device is implemented in an apparatus hosting multiple virtual machines (VMs), and the Netflow data that is collected include data relating to VM-to-VM traffic that is forwarded between VMs operating within the apparatus.

16. The apparatus of claim 9, wherein the apparatus employs a Single Root Virtual I/O (SR-IOV) architecture, and the Netflow data is collected in an Ethernet function block.

17. The apparatus of claim 9, wherein the Netflow data is collected at a network port queue port of the network device.

18. The apparatus of claim 9, wherein the apparatus is configured to support a virtualized execution environment, and Netflow data is collected at a Physical Function (PF) layer of the virtualized execution environment.

19. The apparatus of claim 9, wherein the Netflow data for the Netflow corresponding to the 7-tuple filter match is a Netflow Flow record in a Netflow cache that includes one or more key fields and a length of a flow corresponding to the 7-tuple filter match.

20. An apparatus comprising:
At least one processor, having a plurality of cores;
memory, operatively coupled to the plurality of cores;
a storage device, in which software instructions are stored; and
a physical network switch communicatively coupled to the processor,
wherein the software instructions are configured to be executed on one or more of the plurality of cores to perform operations including,
implementing a hypervisor configured to host a plurality of virtual machines (VMs)
implementing a virtual switch having a plurality of virtual ports communicatively coupled to the plurality of VMs, which is configured to enable network traffic to be forwarded between the VMs without leaving the apparatus;
configuring at least one virtual port in the virtual switch with a plurality of 7-tuple filters, each 7-tuple filter defining a set of 7 packet header field values defining a respective Netflow;
for each of a plurality of packets that do not contain network metadata,
detecting whether a packet received at or sent out from the at least one virtual port belongs to a given Netflow using the plurality of 7-tuple filters;
if a 7-tuple filter match is detected, adding data associated with the packet to Netflow data for the Netflow corresponding to the 7-tuple filter match; and
collecting Netflow data for a plurality of Netflows traversing the virtual switch.

21. The apparatus of claim 20, wherein a Netflow collection agent is implemented in the virtual switch that is configured to forward Netflow data to a Netflow export agent implemented in the physical network switch.

22. The apparatus of claim 21, wherein the Netflow export agent is further configured to transfer Netflow data that is collected via an output port on the physical switch to a Netflow collector.

23. The apparatus of claim 20, wherein the physical network switch is further configured to collect Netflow data for network traffic received at or sent out from at least one port on the physical network switch.

24. The apparatus of claim 20, wherein the Netflow data for the Netflow corresponding to the 7-tuple filter match is a Netflow Flow record in a Netflow cache that includes one or more key fields and a length of a flow corresponding to the 7-tuple filter match.

* * * * *